(12) United States Patent
Xiao et al.

(10) Patent No.: US 12,581,043 B2
(45) Date of Patent: Mar. 17, 2026

(54) LASER PROJECTION APPARATUS AND LASER PROJECTION DISPLAY METHOD

(71) Applicant: HISENSE LASER DISPLAY CO., LTD, Qingdao (CN)

(72) Inventors: Jichen Xiao, Qingdao (CN); Yishi Zhao, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 128 days.

(21) Appl. No.: 18/662,804

(22) Filed: May 13, 2024

(65) Prior Publication Data

US 2024/0380869 A1 Nov. 14, 2024

Related U.S. Application Data

(63) Continuation of application No. 17/332,692, filed on May 27, 2021, now Pat. No. 12,022,240, which is a
(Continued)

(30) Foreign Application Priority Data

Nov. 29, 2018 (CN) .......................... 201811444372.8

(51) Int. Cl.
  *H04N 9/31* (2006.01)
  *G03B 21/00* (2006.01)
  *G03B 21/20* (2006.01)

(52) U.S. Cl.
  CPC .......... *H04N 9/312* (2013.01); *G03B 21/008* (2013.01); *G03B 21/2033* (2013.01); *H04N 9/3114* (2013.01); *H04N 9/3161* (2013.01)

(58) Field of Classification Search
  CPC .... H04N 9/312; H04N 9/3114; H04N 9/3161; H04N 9/3158; H04N 9/3111;
  (Continued)

(56) References Cited

U.S. PATENT DOCUMENTS 8,469,520 B2 * 6/2013 Maeda ................. G03B 21/204
  353/38
11,831,126 B2 * 11/2023 Wu ...................... G03B 21/142
  (Continued)

FOREIGN PATENT DOCUMENTS

CN 101640806 A 2/2010
CN 103827952 A 5/2014
  (Continued)

OTHER PUBLICATIONS

International Search Report and Written Opinion dated Feb. 6, 2020 in corresponding International Application No. PCT/CN2019/120135, translated, 16 pages.
(Continued)

*Primary Examiner* — Magda Cruz
(74) *Attorney, Agent, or Firm* — MH2 TECHNOLOGY LAW GROUP LLP

(57) ABSTRACT

A laser projection apparatus and a laser projection display method are provided. The laser projection apparatus includes a laser source, an optical engine, a projection lens, and a power system architecture. The power system architecture includes a digital light processing (DLP) control processing portion. The DLP control processing portion is configured to: output a first enable signal and a first luminance adjustment signal to a laser driver circuit and a first drive signal to a digital micro-mirror device, in the first period; output a second enable signal and a second luminance adjustment signal to the laser driver circuit and a second drive signal to the digital micro-mirror device, in the second period. The laser driver circuit is configured to: drive a laser array to emit a primary color beam in the first period, and drive the laser array to be turned off in the second period.

20 Claims, 12 Drawing Sheets

Related U.S. Application Data continuation-in-part of application No. PCT/CN2019/120135, filed on Nov. 22, 2019.

(58) Field of Classification Search

CPC ............... H04N 9/3164; G03B 21/008; G03B 21/2033; G03B 21/206; G03B 21/2066; G09G 3/34

USPC ............................................ 353/98; 348/750

See application file for complete search history.

(56) References Cited

U.S. PATENT DOCUMENTS

| | | |
|---|---|---|
| 2002/0030674 A1 | 3/2002 | Shigeta |
| 2002/0063806 A1 | 5/2002 | Ouchi et al. |
| 2005/0111107 A1 | 5/2005 | Takeda et al. |
| 2006/0077358 A1 | 4/2006 | Wang |
| 2009/0161077 A1 | 6/2009 | Maeda et al. |
| 2009/0190045 A1 | 7/2009 | Endo et al. |
| 2013/0094001 A1 | 4/2013 | Oda et al. |
| 2014/0232763 A1* | 8/2014 | Hada ...................... G09G 3/346 |
| | | 345/99 |
| 2015/0194100 A1 | 7/2015 | Hada |
| 2018/0192013 A1 | 7/2018 | Kato et al. |

FOREIGN PATENT DOCUMENTS

| | | |
|---|---|---|
| CN | 104412318 A | 3/2015 |
| JP | H1184419 A | 3/1999 |
| JP | 2008020867 A | 1/2008 |
| JP | 2009109711 A | 5/2009 |
| JP | 2016180786 A | 10/2016 |

OTHER PUBLICATIONS

Chinese Notification of the First Office Action dated Feb. 21, 2022 in corresponding Chinese Application No. 201811444372.8, translated, 15 pages.

Chinese Notification to Grant Patent Right for Invention dated Aug. 1, 2022 in corresponding Chinese Application No. 201811444372.8, translated, 9 pages.

Zhaohua, Jiang et al. "DMD Digital Micromirror Driving Control System Analysis and Its Application," Applied Laser, vol. 32, No. 3, Jun. 2012, translated, 7 pages.

Li, Shao-yi et al. "Design and Implementation of Driving and Controlling System Based on DMD," Measurement and Control Technology, vol. 4, Apr. 2011, translated, 6 pages.

Non-Final Office Action dated Oct. 18, 2023 in parent U.S. Appl. No. 17/332,692, 21 pages.

Notice of Allowance dated Feb. 14, 2024 in parent U.S. Appl. No. 17/332,692, 11 pages.

\* cited by examiner

10

·—·—·—·→ Green fluorescent beam
— — — → Red fluorescent beam
———————→ Blue laser beam

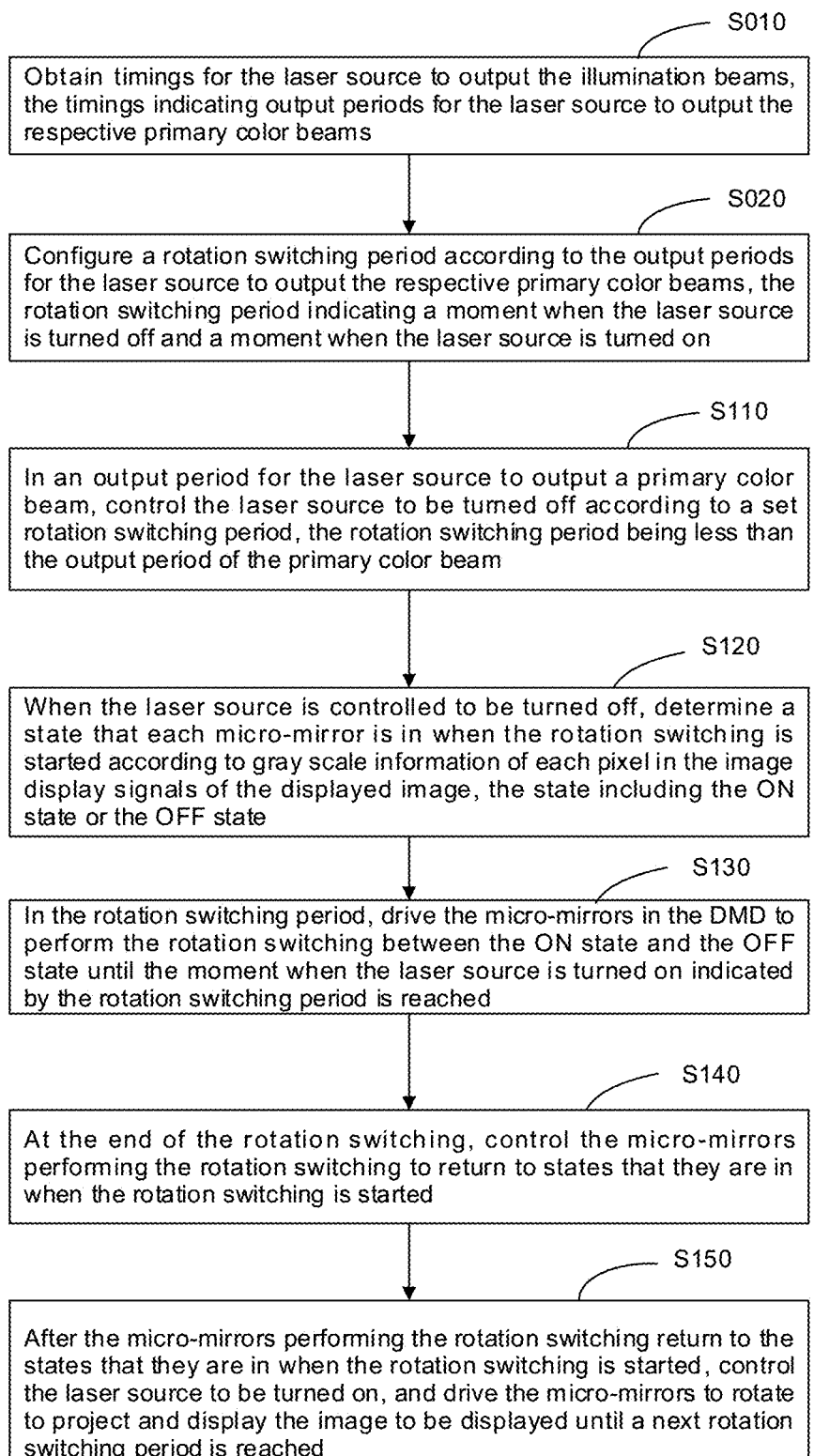

S010

Obtain timings for the laser source to output the illumination beams, the timings indicating output periods for the laser source to output the respective primary color beams

S020

Configure a rotation switching period according to the output periods for the laser source to output the respective primary color beams, the rotation switching period indicating a moment when the laser source is turned off and a moment when the laser source is turned on

S110

In an output period for the laser source to output a primary color beam, control the laser source to be turned off according to a set rotation switching period, the rotation switching period being less than the output period of the primary color beam

S120

When the laser source is controlled to be turned off, determine a state that each micro-mirror is in when the rotation switching is started according to gray scale information of each pixel in the image display signals of the displayed image, the state including the ON state or the OFF state

S130

In the rotation switching period, drive the micro-mirrors in the DMD to perform the rotation switching between the ON state and the OFF state until the moment when the laser source is turned on indicated by the rotation switching period is reached

S140

At the end of the rotation switching, control the micro-mirrors performing the rotation switching to return to states that they are in when the rotation switching is started

S150

After the micro-mirrors performing the rotation switching return to the states that they are in when the rotation switching is started, control the laser source to be turned on, and drive the micro-mirrors to rotate to project and display the image to be displayed until a next rotation switching period is reached

FIG. 9A

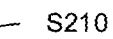

In the spoke region period of the laser source, control the laser source to be turned off according to the set rotation switching period, the rotation switching period is less than the spoke region period, and the spoke region period is the period in which the illumination beams become the mixed color beams after being output by the color filter wheel when the laser source is turned on

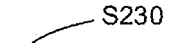

In the rotation switching period, drive the micro-mirrors in the DMD to perform the rotation switching between the ON state and the OFF state until the moment when the laser source is turned on indicated by the rotation switching period is reached At the end of the rotation switching, control the laser source to be turned on, and the micro-mirrors are driven to rotate to project and display the image to be displayed until the next rotation switching period is reached

FIG. 9B

Configure and generate the flip control signal according to a minimum switching time of a micro-mirror, the minimum switching time being a shortest time for the micro-mirror to complete the rotation switching between the ON state and the OFF state once, and the flip control signal indicating the number of times for which the micro-mirror is to perform the rotation switching between the ON state and the OFF state in the rotation switching period

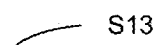

In the rotation switching period, drive the micro-mirror to perform the rotation switching between the ON state and the OFF state according to the number of the times of the rotation switching indicated by the flip control signal

FIG. 9C

LASER PROJECTION APPARATUS AND LASER PROJECTION DISPLAY METHOD

CROSS-REFERENCE TO RELATED APPLICATIONS

This application is a continuation application of U.S. application Ser. No. 17/332,692, filed on May 27, 2021, this U.S. Application is a continuation-in-part of International Patent Application No. PCT/CN2019/120135, filed on Nov. 22, 2019, which claims priority to Chinese Patent Application No. 201811444372.8, filed on Nov. 29, 2018, which are incorporated herein by reference in their entireties.

TECHNICAL FIELD

The present disclosure relates to the field of projection display, and in particular, to a laser projection apparatus and a laser projection display method.

BACKGROUND

A digital light processing (DLP) projection apparatus reflects beams output by a laser source by using a light valve that is configured inside the digital light processing, so as to perform projection display of an image. The light valve is composed of numerous digital micro-mirrors, and is also referred to as a digital micro-mirror device (DMD).

SUMMARY

In one aspect, a laser projection apparatus is provided. The laser projection apparatus includes a laser source, an optical engine, a projection lens, and a power system architecture. The laser source is configured to provide illumination beams. The laser source is a tri-color laser source, and includes a plurality of laser arrays. The plurality of laser arrays are configured to emit beams of a plurality of primary colors. The illumination beams include the beams of the plurality of primary colors. A display cycle of a frame image includes output periods of the beams of the plurality of primary colors. Each of the output periods of the beams of the plurality of primary colors includes at least one first period. The output period of the beam of at least one of the plurality of primary colors further includes a second period. The optical engine includes a digital micro-mirror device. The digital micro-mirror device includes a plurality of micro-mirrors, and the plurality of micro-mirrors are configured to flip at different angles due to control of a first drive signal obtained from conversion of an image display signal, so that the illumination beams provided by the laser source are modulated into projection beams. The projection lens is configured to project the projection beams on a medium for imaging. The power system architecture is configured to control the laser source and the optical engine to operate, and the power system architecture includes a laser driver circuit and a digital light processing (DLP) control processing portion. The laser driver circuit is configured to drive the laser source to be lit or turned off. The DLP control processing portion is connected to the laser driver circuit and the digital micro-mirror device. The DLP control processing portion is configured to: generate a first enable signal and a first luminance adjustment signal according to the image display signal of an image to be displayed, and output the first enable signal and the first luminance adjustment signal to the laser driver circuit, in the first period; generate the first drive signal according to the image display signal, and output the first drive signal to the digital micro-mirror device, in the first period; generate a second enable signal and a second luminance adjustment signal, and output the second enable signal and the second luminance adjustment signal to the laser driver circuit, in the second period; and generate a second drive signal, and output the second drive signal to the digital micro-mirror device, in the second period. The second drive signal is at least partially different from the first drive signal, and the second luminance adjustment signal is zero value. The laser driver circuit is further configured to: receive and perform processing on the first enable signal and the first luminance adjustment signal, and output the processed signals to the corresponding laser array, so as to drive the laser array to emit the beam of the corresponding primary color, in the first period; receive and perform processing on the second enable signal and the second luminance adjustment signal, and output the processed signals to the corresponding laser array, so as to drive the laser array to be turned off, in the second period.

In another aspect, a laser projection apparatus is provided. The laser projection apparatus includes a laser source, an optical engine, a projection lens, and a power system architecture. The laser source is configured to provide illumination beams. The laser source includes a laser array and a color wheel. The laser array is configured to emit a laser beam of one color. The color wheel includes a plurality of regions outputting beams of different primary colors, and is configured to rotate, and sequentially output beams of a plurality of primary colors due to irradiation of the laser beam. The illumination beams include the beams of the plurality of primary colors. A display cycle of a frame image includes output periods of the beams of the plurality of primary colors. Each of the output periods of the beams of the plurality of primary colors includes at least one first period. The output period of the beam of at least one of the plurality of primary colors further includes a second period. The second period is in a spoke region period. Display cycles of a plurality of frame images include the spoke region period. The spoke region period is portions of continuous output periods of beams of two primary colors, and is a continuous period. The spoke region period corresponds to a bordering region of two adjacent regions of the color wheel. The optical engine includes a digital micro-mirror device. The digital micro-mirror device includes a plurality of micro-mirrors, and the plurality of micro-mirrors are configured to flip at different angles due to control of a first drive signal obtained from conversion of an image display signal, so that the illumination beams provided by the laser source are modulated into projection beams. The projection lens is configured to project the projection beams on a medium for imaging. The power system architecture is configured to control the laser source and the optical engine to operate, and the power system architecture includes a laser driver circuit and a DLP control processing portion. The laser driver circuit is configured to drive the laser source to be lit or turned off. The DLP control processing portion is connected to the laser driver circuit and the digital micro-mirror device. The DLP control processing portion is configured to: generate a first enable signal and a first luminance adjustment signal according to the image display signal of an image to be displayed, and output the first enable signal and the first luminance adjustment signal to the laser driver circuit, in the first period; generate the first drive signal according to the image display signal, and output the first drive signal to the digital micro-mirror device, in the first period; generate a second enable signal and a second luminance adjustment signal, and output the second enable signal and the second luminance adjustment signal to the laser driver circuit, in the spoke region period; and generate a second drive signal, and output the second drive signal to the digital micro-mirror device, in the second period. The second drive signal is at least partially different from the first drive signal. The second luminance adjustment signal is zero value. The laser driver circuit is further configured to: receive and perform processing on the first enable signal and the first luminance adjustment signal, and output the processed signals to the laser array, so as to drive the laser array to emit the laser beam, in the first period; receive and perform processing on the second enable signal and the second luminance adjustment signal, and output the processed signals to the laser array, so as to drive the laser array to be turned off, in the spoke region period.

In yet another aspect, a laser projection display method is provided. The method is applied to a laser projection apparatus. The laser projection apparatus includes a laser source, an optical engine, a projection lens, and a power system architecture. The laser source is configured to provide illumination beams. The laser source includes a laser array and a color wheel. The laser array is configured to emit a laser beam of one color. The color wheel includes a plurality of regions outputting beams of different primary colors, and is configured to rotate, and sequentially output beams of a plurality of primary colors due to irradiation of the laser beam. The illumination beams include the beams of the plurality of primary colors. A display cycle of a frame image includes output periods of the beams of the plurality of primary colors. Each of the output periods of the beams of the plurality of primary colors includes a first period. The output period of the beam of at least one of the plurality of primary colors further includes a second period. The second period is in a spoke region period. Display cycles of a plurality of frame images include the spoke region period. The spoke region period is portions of continuous output periods of beams of two primary colors, and is a continuous period. The spoke region period corresponds to a bordering region of two adjacent regions of the color wheel. The optical engine includes a digital micro-mirror device. The digital micro-mirror device includes a plurality of micro-mirrors, and the plurality of micro-mirrors are configured to flip at different angles due to control of a drive signal obtained from conversion of an image display signal, so that the illumination beams provided by the laser source are modulated into projection beams. The projection lens is configured to project the projection beams on a medium for imaging. The power system architecture is configured to control the laser source and the optical engine to operate, and the power system architecture includes a laser driver circuit and a DLP control processing portion. The laser driver circuit is configured to drive the laser source to be lit or turned off. The DLP control processing portion is connected to the laser driver circuit and the digital micro-mirror device. The method includes: controlling the laser array to emit the laser beam and the digital micro-mirror device to project and display an image to be displayed according to the image display signal of the image to be displayed, in the first period; controlling the laser array to be turned off, in the spoke region period; and controlling all or part of the micro-mirrors in the digital micro-mirror device to perform rotation switching between an ON state and an OFF state, in the second period.

In yet another aspect, a non-transitory computer-readable storage medium is provided. The non-transitory computer-readable storage medium stores computer program instructions that, when executed by a processor, cause the processor to implement the above method.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

FIG. 9A is a flow diagram of a laser projection display method, in accordance with some embodiments;

FIG. 9B is a flow diagram of another laser projection display method, in accordance with some embodiments;

FIG. 9C is a flow diagram of S130 or S230;

DETAILED DESCRIPTION

Figure 1:
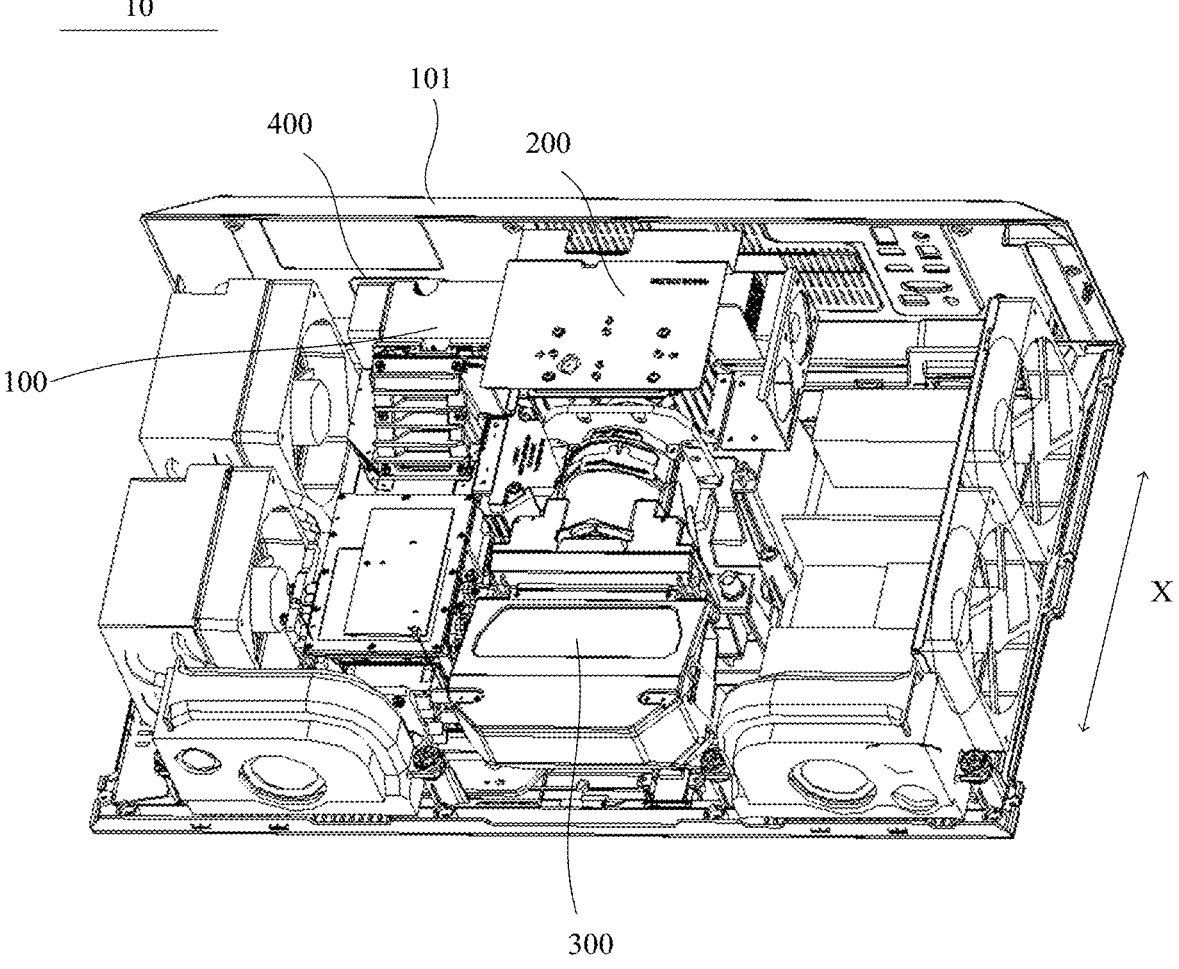
FIG. 1 is a schematic diagram showing a structure of a laser projection apparatus, in accordance with some embodiments.

Technical solutions in some embodiments of the present disclosure will be described below clearly and completely with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the description and the claims are construed as open and inclusive, i.e., "inclusive, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

In the description of some embodiments, the term "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The use of the phrase "applicable to" or "configured to" herein means an open and inclusive language, which does not exclude devices that are applicable to or configured to perform additional tasks or steps.

Some embodiments of the present disclosure provide a laser projection apparatus. As shown in FIG. 1, the laser projection apparatus 10 includes an apparatus housing 101 (only part of the housing 101 being shown in FIG. 1), and a laser source 100, an optical engine 200, and a projection lens 300 that are assembled in the apparatus housing 101. The laser source 100 is configured to provide illumination beams (laser beams). The optical engine 200 is configured to modulate the illumination beams provided by the laser source 100 with image display signals to obtain projection beams. The projection lens 300 is configured to project the projection beams on a screen or a wall for imaging. The laser source 100, the optical engine 200, and the projection lens 300 are sequentially connected in a propagation direction of the beams, and are each wrapped by a corresponding housing. Housings of the laser source 100, the optical engine 200 and the projection lens 300 support their optical components respectively and make the optical components meet certain sealing or airtight requirements. For example, the laser source 100 is hermetically sealed through its housing, which may well solve a light attenuation problem of the laser source 100.

One end of the optical engine 200 is connected to the projection lens 300, and the optical engine 200 and the projection lens 300 are disposed in a first direction X of the entire apparatus. For example, the first direction X may be a width direction of the entire apparatus. The other end of the optical engine 200 is connected to the laser source 100. In the present example, the laser source 100, the optical engine 200, and the projection lens 300 are connected in an "L" shape. On one hand, such a connection structure may adapt to characteristics of a beam path of a reflective light valve in the optical engine 200; and on another hand, it is also conducive to shortening a length of a beam path in a one-dimensional direction, which is in turn conducive to structural arrangement of the entire apparatus. For example, in a case where the laser source 100, the optical engine 200, and the projection lens 300 are disposed in the one-dimensional direction (e.g., a direction perpendicular to the first direction X), the length of the beam path in this direction is long, which is not conducive to the structural arrangement of the entire apparatus.

Figure 2:
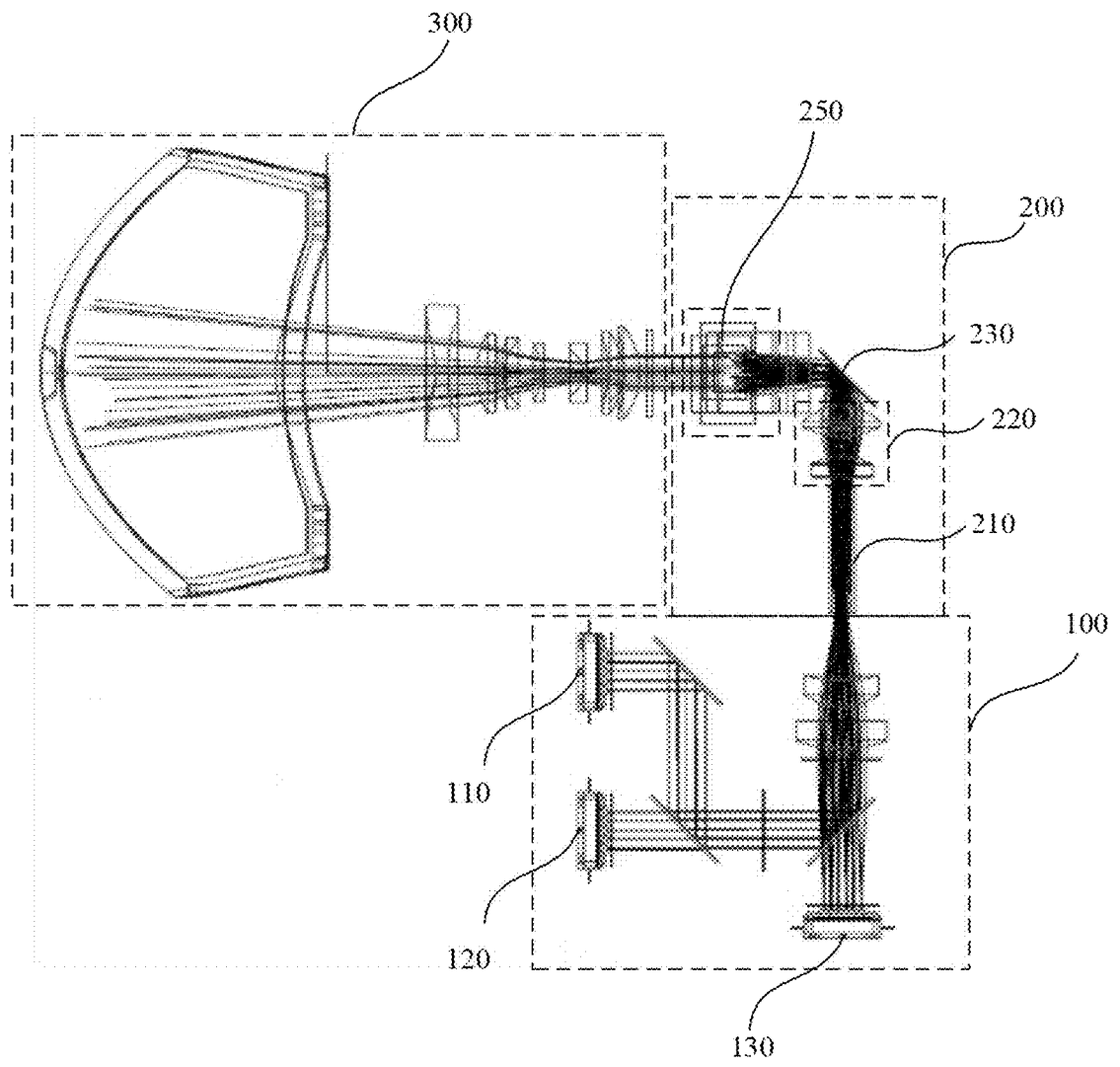
FIG. 2 is a schematic diagram of a laser source, an optical engine, and a projection lens in a laser projection apparatus, in accordance with some embodiments.

In some embodiments, referring to FIG. 2, the laser source 100 may include three laser arrays. The three laser arrays may be a red laser array 130, a green laser array 120, and a blue laser array 110. That is, the laser source 100 is a tri-color laser source, but is not limited thereto. The three laser arrays may also all be blue laser arrays 110, or, two blue laser arrays 110 and one red laser array 130.

In some embodiments, the laser source 100 may further include two laser arrays or one laser array (a mono-color laser source). The two laser arrays may be a blue laser array 110 and a red laser array 130, that is, the laser source 100 is a dual-color laser source. The two laser arrays may also both be blue laser arrays 110. In the mono-color laser source, referring to FIG. 4, the one laser array may be a blue laser array 110.

Figure 4:
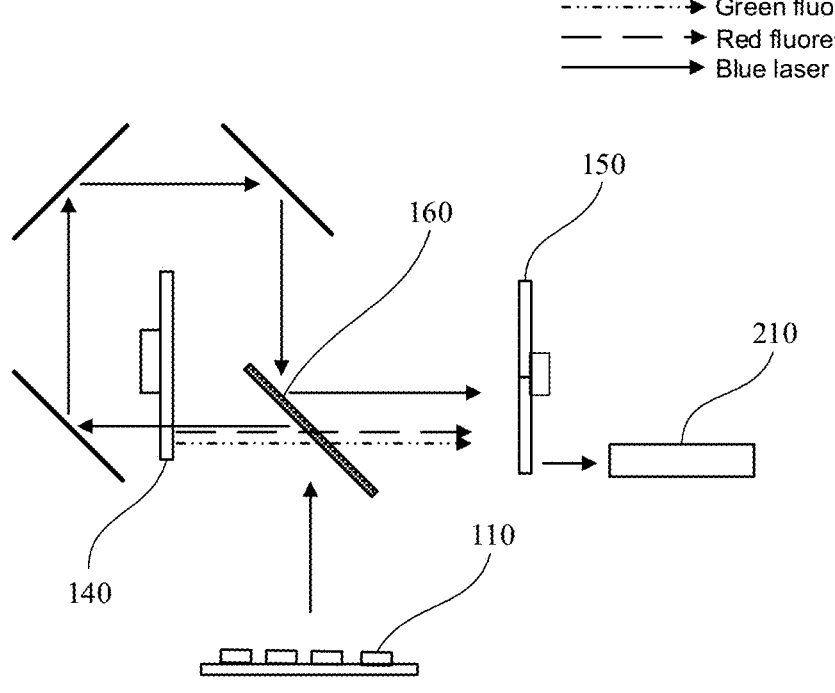
FIG. 4 is a schematic diagram showing a principle of a beam path of a laser source in a laser projection apparatus, in accordance with some embodiments.

In a case where the laser source 100 includes only the blue laser array(s) 110, or only the blue laser array(s) 110 and the red laser array 130, as shown in FIG. 4, the laser source 100 may further include a phosphor wheel 140 and a color filter wheel 150. After a blue laser array 110 emits blue laser beams, some of the blue laser beams hit the phosphor wheel 140 to generate red fluorescent beams (in a case where the laser source 100 includes the red laser array 130, the red fluorescent beams do not need to be generated) and green fluorescent beams. Then, the blue laser beams, the red fluorescent beams (or red laser beams) and the green fluorescent beams travel to the color filter wheel 150 through a light merging component 160 and may be filtered through the color filter wheel 150, and then beams of three primary colors are sequentially output. According to a trichromatic mixing principle, human eyes are unable to distinguish the colors of the beams at a certain instance, and what are perceived by the human eyes are still mixed white beams.

In some embodiments, a dichroscope can be chosen as the light merging component 160, and it can reflect the laser light and transmit the fluorescent light from the phosphor wheel 140.

Figure 3:
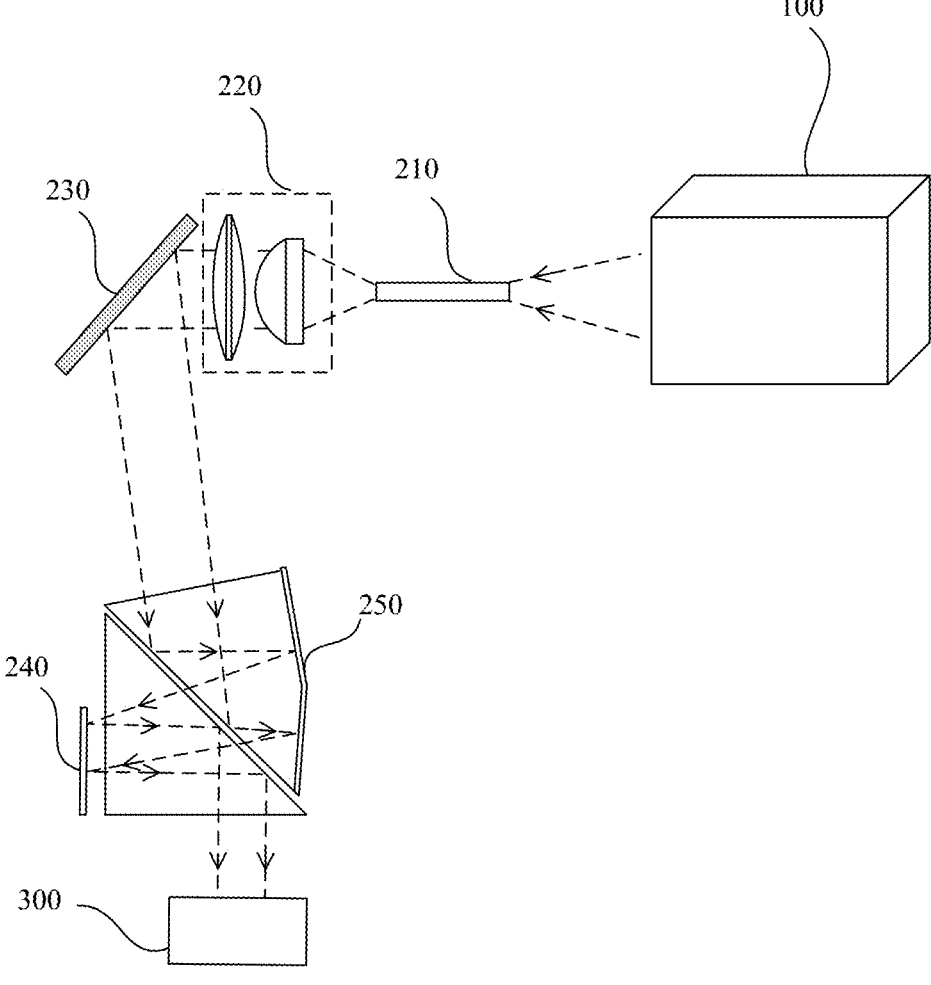
FIG. 3 is a schematic diagram of a beam path architecture in a laser projection apparatus, in accordance with some embodiments.

The illumination beams emitted by the laser source 100 enter the optical engine 200. Referring to FIGS. 2 and 3, the optical engine 200 may include: a light pipe 210, a lens assembly 220, a reflector 230, a digital micro-mirror device (DMD) 240 and a prism assembly 250. The light pipe 210 may receive the illumination beams provided by the laser source 100 and homogenize the illumination beams. The lens assembly 220 may first amplify the illumination beams homogenized by the light pipe 210, and then converge the illumination beams and emit the illumination beams to the reflector 230. The reflector 230 may reflect the illumination beams that are first amplified and then converged by the lens assembly 220 to the prism assembly 250. The prism assembly 250 reflects the illumination beams reflected by the reflector 230 to the DMD 240, and the DMD 240 modulates the illumination beams to obtain the projection beams, and reflects the projection beams obtained after the modulation into the projection lens 300.

In the optical engine 200, the DMD 240 is a core component, which plays a role of modulating the illumination beams provided by the laser source 100 through the image display signals. That is, the DMD 240 controls the projection beams to display different colors and luminances according to different pixels of an image to be displayed, so as to finally form an optical image. Therefore, the DMD 240 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the digital micro-mirror device 240 shown in FIGS. 2 and 3 reflects the illumination beams, and thus the digital micro-mirror device is a reflective optical modulator. A liquid crystal light valve transmits the illumination beams, and thus the liquid crystal light valve is a transmissive optical modulator. In addition, according to the number of the optical modulators (or the light valves) used in the optical engine, the optical engine may be classified as a single-chip system, a double-chip system, or a three-chip system. For example, only one digital micro-mirror device 240 is used in the optical engine 200 shown in FIGS. 2 and 3, and thus the optical engine 200 may be referred to as a single-chip system. In a case where three digital micro-mirror devices are used, the optical engine 200 may be referred to as a three-chip system.

Figure 5:
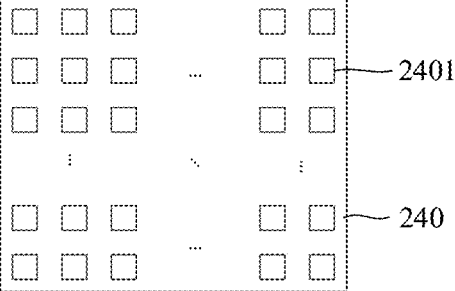
FIG. 5 is a schematic diagram showing an arrangement of micro-mirrors in a digital micro-mirror device, in accordance with some embodiments.
Figure 7:
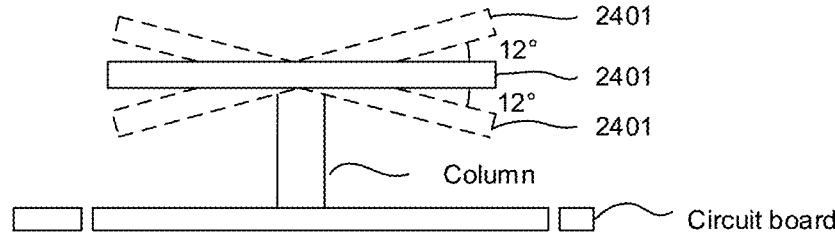
FIG. 7 is a schematic diagram showing a swing position of a micro-mirror in the digital micro-mirror device shown in FIG. 5.

The digital micro-mirror device 240 is applied to a digital light processing (DLP) projection architecture. The optical engine 200 shown in FIGS. 2 and 3 uses the DLP projection architecture. As shown in FIG. 5, the digital micro-mirror device 240 includes thousands of micro-mirrors 2401 that may be individually driven to deflect. These micro-mirrors 2401 are arranged in an array, and each micro-mirror 2401 corresponds to one pixel in the image to be displayed. In the DLP projection architecture, each micro-mirror 2401 is equivalent to a digital switch. As shown in FIG. 7, the micro-mirror may swing by a range of plus or minus 12 degrees (i.e., ±12°) or a range of plus or minus 17 degrees (i.e., ±17°) under action of an external force.

Figure 6:
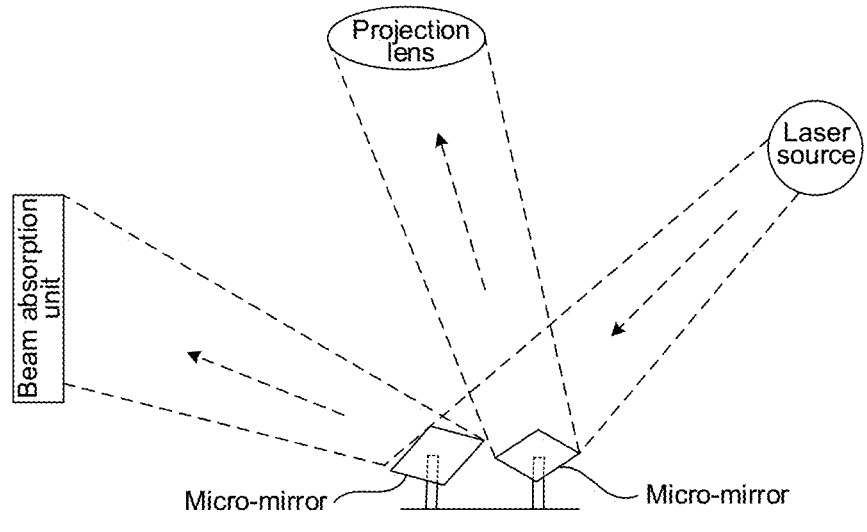
FIG. 6 is a schematic diagram showing operation of micro-mirrors, in accordance with some embodiments.

As shown in FIG. 6, a beam reflected by a micro-mirror 2401 at a negative deflection angle is referred to as an OFF beam, which is an ineffective beam, and usually hits the apparatus housing 101 and the housing of the optical engine 200 or is absorbed by a beam absorption unit. A beam reflected by a micro-mirror 2401 at a positive deflection angle is referred to as an ON beam, which is an effective beam entering the projection lens 300 when the micro-mirror 2401 on a surface of the DMD 240 is irradiated by an illumination beam and reflected at a positive deflection angle, and is used for projection imaging. An ON state of the micro-mirror 2401 is a state that the micro-mirror 2401 is in and may be maintained when the illumination beam emitted by the laser source 100 may enter the projection lens 300 after being reflected by the micro-mirror 2401. That is, the micro-mirror 2401 is in a state of positive deflection angle. An OFF state of the micro-mirror 2401 is a state that the micro-mirror 2401 is in and may be maintained when the illumination beam emitted by the laser source 100 does not enter the projection lens 300 after being reflected by the micro-mirror 2401. That is, the micro-mirror 2401 is in a state of negative deflection angle.

For example, for a micro-mirror 2401 with a deflection angle of ±12°, a state at +12° is the ON state, and a state at −12° is the OFF state. For a deflection angle between −12° and +12°, it is not used in practice, and actual operation states of the micro-mirror 2401 are only the ON state and the OFF state. For a micro-mirror 2401 with a deflection angle of ±17°, a state at +17° is the ON state, and a state at −17° is the OFF state. The image display signals are converted into digital codes such as 0 and 1 after being processed, and these digital codes may drive the micro-mirrors 2401 to swing.

In a display cycle of a frame image, part or all of the micro-mirrors 2401 are switched once between the ON state and the OFF state, so that gray scales of the pixels in the frame image are achieved according to durations of the micro-mirrors 2401 in the ON state and the OFF state. For example, in a case where the pixels have 256 gray scales from 0 to 255, micro-mirrors corresponding to the gray scale 0 are each in the OFF state in an entire display cycle of the frame image, micro-mirrors corresponding to the gray scale 255 are each in the ON state in the entire display cycle of the frame image, and micro-mirrors corresponding to the gray scale 127 are each in the ON state for a half of time and in the OFF state for the other half of the time in the display cycle of the frame image. Therefore, by controlling a state that each micro-mirror in the DMD 240 is in and a duration of each state in the display cycle of the frame image under the image display signals, a luminance (gray scale) of a pixel corresponding to the micro-mirror 2401 may be controlled, and a purpose of modulating the illumination beams projected onto the DMD 240 may be achieved.

The light pipe 210, the lens assembly 220 and the reflector 230 in front of the DMD 240 form an illumination beam path. After passing through the illumination beam path, the illumination beams emitted by the laser source 100 are made to conform to a beam size and an incident angle required by the DMD 240.

As shown in FIG. 2, the projection lens 300 includes a combination of a plurality of lenses, which are usually divided by group, and are divided into a three-segment combination including a front group, a middle group and a rear group, or a two-segment combination including a front group and a rear group. The front group is a lens group proximate to a laser-exit side (a left side shown in FIG. 2) of the laser projection apparatus, and the rear group is a lens group proximate to a laser-exit side (a right side shown in FIG. 2) of the optical engine 200. The projection lens 300 may be a zoom projection lens, or a prime adjustable-focus projection lens, or a prime projection lens. In some embodiments, the laser projection apparatus is an ultra-short-focus projection apparatus. The projection lens 300 is an ultra-short-focus projection lens, and a projection ratio of the projection lens 300 is usually less than 0.3, such as 0.24.

Figure 8:
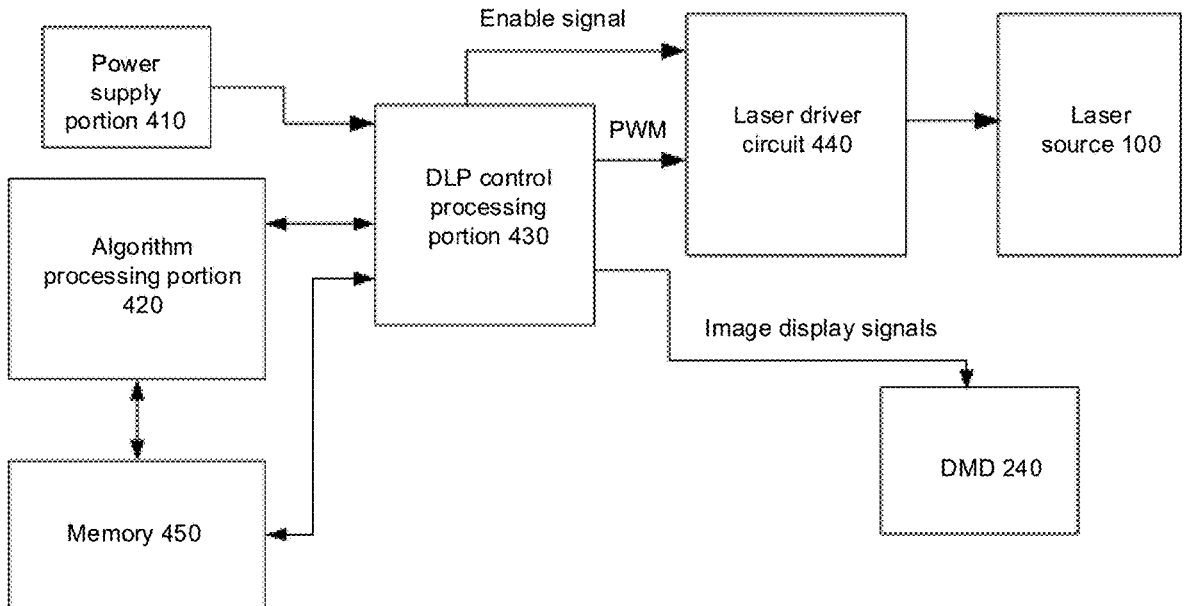
FIG. 8 is a diagram of a power system architecture of a laser projection apparatus, in accordance with some embodiments.

As shown in FIG. 1, the laser projection apparatus 10 further includes a power system architecture 400, and the power system architecture 400 may be a printed circuit board assembly (PCBA). FIG. 1 only shows an approximate position of the power system architecture 400, and a specific position of the power system architecture 400 may be arranged differently in different laser projection apparatuses 10. As shown in FIG. 8, the power system architecture includes a power supply portion 410, an algorithm processing portion 420, a DLP control processing portion 430, a laser driver circuit 440, and a memory 450.

The power supply portion 410 is connected to the DLP control processing portion 430, and is configured to supply power to other components in the power system architecture 400 (including the algorithm processing portion 420, the DLP control processing portion 430, and the laser driver circuit 440), the laser source 100 and the DMD 240.

The algorithm processing portion 420 is connected to the DLP control processing portion 430, and is configured to receive image display signals which are obtained by decoding a video signal source, and perform algorithm processing such as contrast processing or luminance gain processing on the image display signals, and transmit the processed image display signals to the DLP control processing portion 430. For example, operations of encoding and decoding the video signal source may be performed by a TV signal board, which is not shown in the figure. The algorithm processing portion 420 is usually composed of a field programmable gate array (FPGA), and may also be an advanced RISC machine (ARM for short, in which a full name of RISC is reduced instruction set computing) processor. The algorithm processing portion 420 may be provided separately, or may be integrated into the DLP control processing portion 430.

The DLP control processing portion 430 is connected to the laser driver circuit 440 and the DMD 240, and is configured to generate enable signals and pulse width modulation (PWM) luminance adjustment signals according to the image display signals received and processed by the algorithm processing portion 420, and output the enable signals and the PWM luminance adjustment signals to the laser driver circuit 440. In addition, the DLP control processing portion 430 also outputs the image display signals to the DMD 240. The DMD 240 converts the received image display signals into drive signals, and the drive signals control the micro-mirrors 2401 in the DMD 240 to flip at different angles. The DLP control processing portion 430 may be a main control chip, a general-purpose central processing unit (CPU), a microprocessor unit (MPU), a chip, a microchip, an integrated circuit (IC), etc.

The laser driver circuit 440 is connected to the laser source 100, and is configured to perform processing (e.g., anti-attenuation processing and digital-to-analog conversion processing) on the received enable signals and PWM luminance adjustment signals from the DLP control processing portion 430, and output the processed signals to the laser source 100, so as to drive the laser source 100 to emit illumination beams of corresponding colors and luminances. For example, when a red component of a frame image is wished to be displayed, the DLP control processing portion 430 outputs a red primary color beam enable signal R_EN and a red primary color beam luminance adjustment signal R_PWM to the laser driver circuit 440, the laser driver circuit 440 processes the signals and outputs the processed signals to the laser source 100, and the laser source 100 emits red primary color beams of a corresponding color and luminance according to a corresponding signal.

In some embodiments, such as in a schematic diagram showing a principle of a beam path of the laser source 100 shown in FIG. 4, the laser source 100 only includes the blue laser array 110, and the red primary color beams need to be generated through conversion of a fluorescent substance on the phosphor wheel 140 excited by the blue laser beams. The red primary color beam enable signal R_EN and the red primary color beam luminance adjustment signal R_PWM are output to the blue laser array 110, and the phosphor wheel 140 is irradiated by lighting the blue laser array 110 to generate red fluorescent primary color beams with a corresponding luminance.

Figure 10:
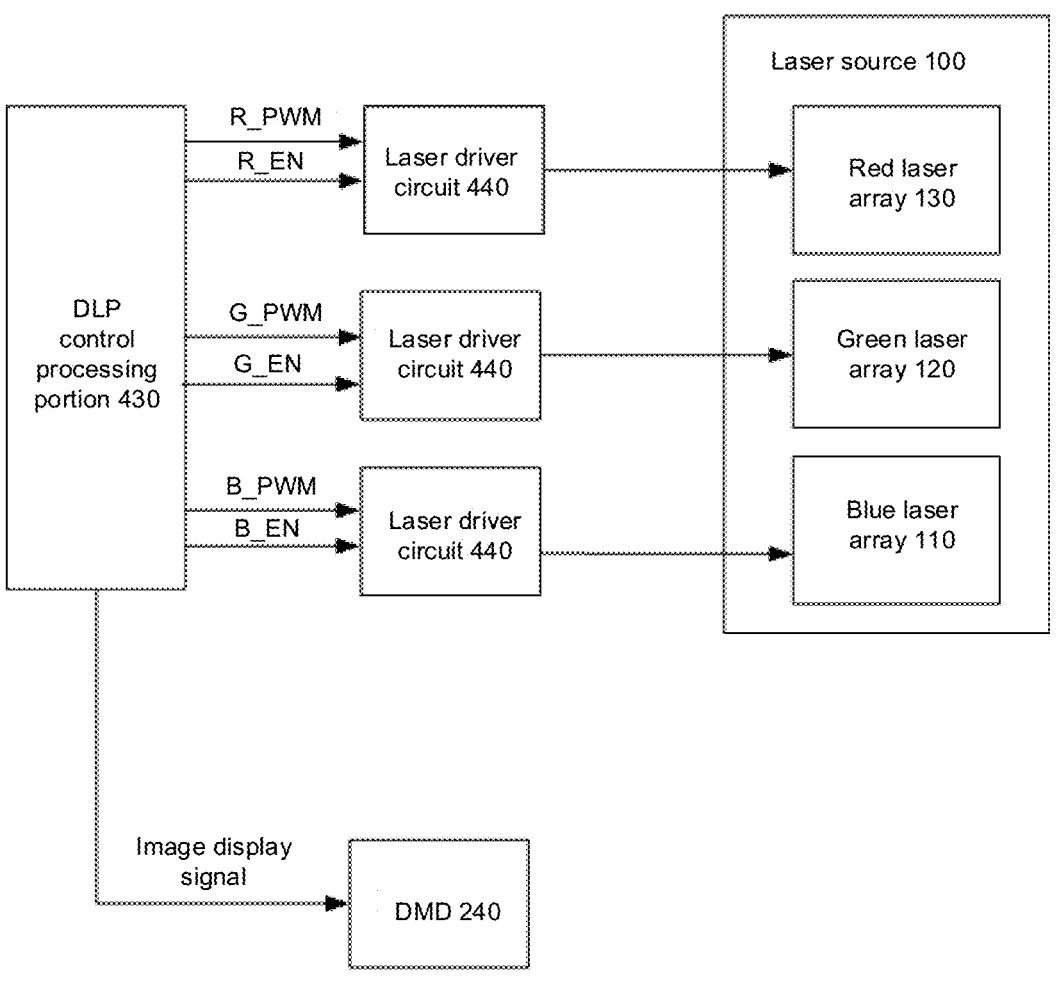
FIG. 10 is a diagram showing a driving principle of a laser source, in accordance with some embodiments.

In some embodiments, such as in a schematic diagram of the laser source, the optical engine and the projection lens shown in FIG. 2, the laser source 100 includes the red laser array 130, the green laser array 120, and the blue laser array 110. That is, the laser source 100 is a tri-color laser source. When the DLP control processing portion 430 outputs the red primary color beam enable signal R_EN and the red primary color beam luminance adjustment signal R_PWM to the laser driver circuit 440, the two signals are directly applied to the red laser array 130 through the laser driver circuit 440, and the red laser array 130 emits red primary color laser beams with a corresponding luminance according to the two signals. FIG. 10 shows a schematic diagram of a driving principle of the tri-color laser source. In FIG. 10, a laser array of each color receives a corresponding enable signal (which is also referred to as a timing signal), and a luminance adjustment signal PWM.

When the laser driver circuit 440 receives the enable signals and the PWM luminance adjustment signals corresponding to respective primary color beam components, the DMD 240 synchronously receives the image display signals corresponding to the respective primary color beam components. For example, an image display signal of a red primary color beam component is converted into a drive signal 0 or 1 of the DMD 240, flips of the micro-mirrors 2401 in the DMD 240 are controlled according to a distribution and duration of the 0 or 1 signals, and a luminance of beams finally output corresponds to a gray scale of the red component in the frame image, and the beams are finally projected into the projection lens 300. With reference to the above principle, the blue primary color beams and the green primary color beams are also processed similarly. Beams corresponding to gray scales of the three primary color beam components are sequentially projected into the projection lens 300, and then the beams are imaged and magnified by the projection lens 300 and presented on a projection medium, finally the three primary color beam components are sequentially superimposed to form a color image by using a visual persistence effect of the human eyes.

In the above process, the thousands of micro-mirrors 2401 on the surface of the DMD 240 are continuously flipped to complete the modulation of the illumination beams.

The memory 450 may be a random access memory (RAM), a flash memory, a read only memory (ROM), an erasable programmable ROM (EPROM), an electrically EPROM (EEPROM), a register, a hard disk, a mobile hard disk, a compact disc read only memory (CD-ROM) or a storage medium of any other form known in the art. The memory 450 may exist separately and be connected with the algorithm processing portion 420 and the DLP control processing portion 430, or the memory 450 may be integrated with the algorithm processing portion 420 and the DLP control processing portion 430.

Since the micro-mirrors 2401 included in the DMD 240 are high-precision devices, they are easily damaged and have a short service life. For example, in a case where a same picture needs to be displayed for a long time (in which case a plurality of consecutive frame images are all the same), or contents of a plurality of consecutively displayed pictures have a high degree of duplication, it is possible to make the micro-mirrors 2401 remain in a same state for a long time, for example, they may remain in the ON state or the OFF state for a relatively long time. However, this may easily cause mechanical fatigue of the micro-mirrors 2401, affect operational reliability and a service life of the DMD 240, and even easily cause damage to the DMD 240, thereby affecting a projection display effect.

Based on a working process of the laser projection apparatus, some embodiments of the present disclosure provide a laser projection display method. As shown in FIG. 9A, the laser projection display method includes the following steps.

In S010, timings for the laser source to output the illumination beams are obtained, the timings indicating output periods for the laser source to output respectively the primary color beams.

Since the laser source 100 sequentially outputs the red, green and blue beams, there are timings for emitting respectively the primary color beams correspondingly. For example, the timings are sequence on time that the enable signals R_EN, G_EN and B_EN are sent by the DLP control processing portion 430 to the laser driver circuit 440. Therefore, in some embodiments, the timings for outputting the illumination beams by the laser source 100 may be obtained by the DLP control processing portion 430; or, the timings for outputting the illumination beams by the laser source 100 may be obtained by another processor different from the DLP control processing portion 430. The processor may be a CPU, a MPU, a chip, a microchip, an IC, etc.

Figure 12:
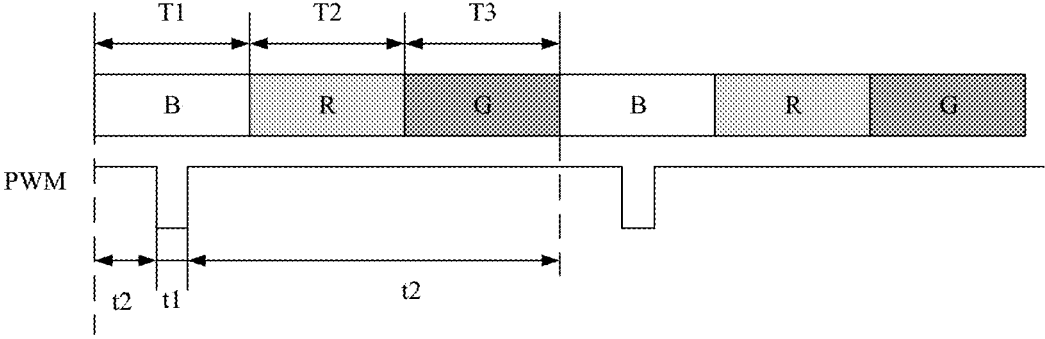
FIG. 12 is a schematic diagram of a rotation switching period, in accordance with some embodiments.

As shown in FIG. 12, the laser source outputs a blue beam (B) in a period T1, a red beam (R) in a period T2, and a green beam (G) in a period T3. Time period for the laser source 100 to complete the sequential output of the respective primary color beams once is a cycle for the laser source to output the primary color beams. In a display cycle of a color frame image, the laser source 100 performs the sequential output of the respective primary color beams once. Therefore, the display cycle of the color frame image is equal to the cycle for the laser source to output the primary color beams, and they are both equal to a sum of T1, T2 and T3.

Figure 11:
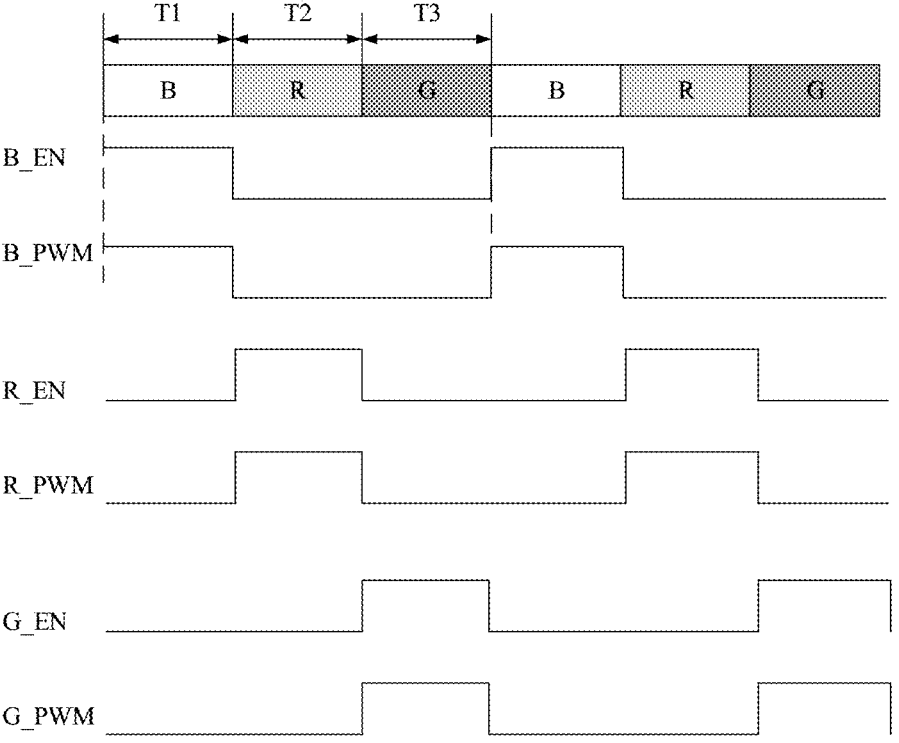
FIG. 11 is a schematic diagram showing switching of timings of primary color beams, in accordance with some embodiments.

A principle that the laser source 100 sequentially outputs the blue beam, the red beam and the green beam is described by taking an example in which the laser source 100 is the tri-color laser source. As shown in FIGS. 10 and 11, the DLP control processing portion 430 generates a blue primary color beam enable signal B_EN, a blue primary color beam luminance adjustment signal B_PWM, the red primary color beam enable signal R_EN, the red primary color beam luminance adjustment signal R_PWM, a green primary color beam enable signal G_EN, and a green primary color beam luminance adjustment signal G_PWM, and outputs these signals to the laser driver circuit 440.

The blue primary color beam enable signal B_EN indicates that only the blue laser array is lit, and the red laser array and the green laser array are not lit in the period T1. The red primary color beam enable signal R_EN indicates that only the red laser array is lit in the period T2, and the green primary color beam enable signal G_EN indicates that only the green laser array is lit in the period T3. The blue primary color beam luminance adjustment signal, the red primary color beam luminance adjustment signal, and the green primary color beam luminance adjustment signal indicate luminances of the primary color beams emitted by the corresponding laser arrays. An effective duration of each primary color beam enable signal is equal to an effective lighting duration of a corresponding luminance adjustment signal. The effective lighting duration of the luminance adjustment signal refers to a duration of a PWM pulse signal capable of lighting a laser array in the display cycle of the frame image, such as a duration of the period T1, a duration of the period T2, or a duration of the period T3.

The laser driver circuit 440 drives the corresponding laser arrays to emit the illumination beams of the corresponding colors and luminances according to the above signals. Effective durations of the enable signals corresponding to the respective primary color beams are determined according to a ratio among the respective primary colors of a white balance of an image. For example, the blue primary color beam occupies 34% of the display cycle of the frame image, the red primary color beam occupies 46% of the display cycle of the frame image, and the green primary color beam occupies 20% of the display cycle of the frame image. Then, in a timing diagram, a ratio among the durations of the enable signals corresponding to the blue, red and green primary color beams is 0.34:0.46:0.2.

In S020, a rotation switching period is configured according to the output periods for the laser source to output the respective primary color beams, the rotation switching period (i.e., a second period) indicating a moment when the laser source is turned off and a moment when the laser source is turned on.

Time between the moment when the laser source 100 is turned off and the moment when the laser source 100 is turned on is the rotation switching period. In the rotation switching period, the laser source 100 is turned off, and the micro-mirrors 2401 are repeatedly flipped to avoid the mechanical fatigue of the micro-mirrors 2401.

In some embodiments, the rotation switching period may be configured by the DLP control processing portion 430; or, the rotation switching period may be configured by the processor performing S010.

In some embodiments, since the human eyes are the least sensitive to the blue color relative to the red color and the green color, and the blue color contributes the least to a luminance of a displayed image (the luminance contribution being luminance data determined according to a vision function, which is a luminance perceived by the human eyes, and is different from luminance data measured through an instrument, i.e., an actual luminance), the rotation switching period is configured in the output period of the blue beam output by the laser source 100. Even if the laser source is turned off in the output period of the blue beam, the luminance of the projected and displayed image is not greatly changed, and the human eyes cannot distinguish the change, thereby reducing impact on the luminance of the projected and displayed image.

In some embodiments, as shown in FIG. 12, the rotation switching period t1 is configured within the output period T1 of the blue beam. The laser source 100 is turned off in the rotation switching period t1, the laser source 100 is turned on in a remaining period t2 (i.e., a first period), and in the rotation switching period t1, the micro-mirrors 2401 perform rotation switching (i.e., repeated flipping) between the ON state and the OFF state. In some embodiments, a duration of the rotation switching period t1 needs to ensure that in the rotation switching period, the micro-mirrors 2401 perform the rotation switching between the ON state and the OFF state for an integer number of times, which is at least one time, or may be, for example, several times, a dozen times, several tens of times, or several hundreds of times.

In some embodiments, the duration of the rotation switching period t1 is 1% to 4.5%, e.g., 1%, 1.5%, 1.9%, 2%, 2.5%, 3.2%, 3.6%, 4.2%, or 4.5%, of the cycle for the laser source to output the primary color beams. Taking an example in which a refresh rate of the laser projection apparatus is 120 Hz, the display cycle of the color frame image is 8.33 ms, and the cycle for the laser source to output the primary color beams is 8.33 ms. Correspondingly, the duration of the rotation switching period t1 obtained through calculation is 83.3 us, 124.95 us, 158.27 us, 166.6 us, 208.25 us, 266.56 us, 299.88 us, 349.86 us, or 374.85 us. If the refresh rate of the laser projection apparatus is 240 Hz, the display cycle of the color frame image is 4.167 ms, and the cycle for the laser source to output the primary color beams is 4.165 ms. Correspondingly, the duration of the rotation switching period t1 obtained through calculation is 41.65 us, 62.48 us, 79.14 us, 83.3 us, 104.13 us, 133.28 us, 149.94 us, 174.93 us, or 187.43 us.

Of course, FIG. 12 only shows that the laser source is turned off only once in the display cycle of the color frame image, which is merely an illustrative example, and cannot be considered as a limitation on a scope of use of the present disclosure. In some other embodiments, the laser source may be turned off for a plurality of times in the display cycle of the color frame image (i.e., setting a plurality of rotation switching periods t1), which is not specifically limited here. FIG. 12 only shows that the rotation switching period t1 is configured within the output period T1 of the blue beam. The rotation switching period t1 may also be configured within the output period T2 of the red beam or the output period T3 of the green beam, and the rotation switching period t1 may also be configured within all of the output period T1 of the blue beam, the output period T2 of the red beam, and the output period T3 of the green beam.

In S110, in an output period for the laser source to output a primary color beam, the laser source is controlled to be turned off according to a set rotation switching period, the rotation switching period being less than the output period of the primary color beam.

In some embodiments, the DLP control processing portion 430 stops sending the enable signals R_EN, G_EN and B_EN or the luminance adjustment signals R_PWM, G_PWM and B_PWM to the laser driver circuit 440 within the set rotation switching period t1, so that the laser driver circuit 440 controls the laser source 100 to be turned off.

The primary color beam output by the laser source 100 may be a red beam, a blue beam, or a green beam. The output period of the primary color beam is a duration of the primary color beam output according to the timings for outputting the illumination beams by the laser source 100.

The rotation switching period is configured within the output period of the primary color beam, and is less than the output period of the primary color beam. Therefore, it is possible to ensure that a moment when the micro-mirrors 2401 start the rotation switching and a moment when the micro-mirrors 2401 end the rotation switching are not only within a display cycle of a same frame image, but also within time for displaying the primary color in the display cycle of the frame image.

By controlling the laser source 100 to be turned off, it is possible to ensure that the laser source 100 does not emit light during the rotation switching of the micro-mirrors 2401, thereby preventing the illumination beams output by the laser source 100 from affecting the displayed image after being reflected by the micro-mirrors 2401 during the rotation switching of the micro-mirrors 2401.

In some embodiments, as shown in FIG. 12, the rotation switching period t1 is configured within the output period T1 of the blue beam, and the duration of the rotation switching period t1 is less than the duration of the output period T1 of the blue beam, so that a start moment and an end moment of the rotation switching period t1 are both within the output period T1 of the blue beam. While the DLP control processing portion 430 outputs the blue primary color beam enable signal, the blue primary color beam luminance adjustment signal B_PWM output in the t1 period is 0. When the laser driver circuit 440 receives the signal B_PWM with a value of 0, the blue laser array 110 is turned off, that is, the laser source 100 is turned off; and when the signal B_PWM with a non-zero value is received again, the blue laser array 110 is lit again, that is, the laser source 100 is turned on. In this way, in the period for outputting the blue primary color beam, there is a short extinguishing period of the blue laser array 110. The extinguishing period is used to provide a rotation switching period for the micro-mirrors 2401. Since a ratio of the rotation switching period t1 to an entire output period of the blue primary color beam is not large, the luminance of the frame image is not significantly changed, and the luminance of the projected and displayed picture is not affected.

In S120, when the laser source is controlled to be turned off, a state that each micro-mirror is in when the rotation switching is started is determined according to gray scale information of each pixel in the image display signals of the displayed image, the state including the ON state or the OFF state.

In some embodiments, the state of each micro-mirror 2401 when the rotation switching is started may be determined by the DLP control processing portion 430, and the state may be stored in the memory 450; or, the state of each micro-mirror 2401 when the rotation switching is started may be determined by the processor performing S010, and the state may be stored in the memory 450.

In the projection display process, the transmission of the image display signals to the micro-mirrors 2401 in the rotation switching period t1 is paused, and the micro-mirrors 2401 are driven by, for example, a flip control signal to flip repeatedly; and at the end of the rotation switching period t1, the micro-mirrors 2401 are re-driven by the image display signals of the image to be displayed, so that the projection display of the image to be displayed is achieved in combination with the primary color beams output by the laser source 100. The image display signals of the image to be displayed indicate the gray scale of each pixel in the image to be displayed. The gray scale of each pixel determines the state of the micro-mirror 2401 corresponding to the pixel when the image to be displayed is displayed, i.e., the ON state or the OFF state.

At the end of the rotation switching, if each micro-mirror 2401 does not return to the state that the micro-mirror 2401 is in when the rotation switching is started, it is possible to cause the micro-mirror 2401 to display normally from a current state. However, the state that the micro-mirror 2401 is currently in may be different from the state that it is in when the rotation switching is started, which may cause the picture projected by the laser projection apparatus to jitter.

Therefore, when the laser source 100 is turned off, a state that each micro-mirror 2401 is in at this moment may be determined according to gray scale information of each pixel in image display signals of a current projected image, so that the micro-mirror 2401 can be restored to this state when the rotation switching ends.

In S130, in the rotation switching period, the micro-mirrors in the DMD are driven to perform the rotation switching between the ON state and the OFF state until the moment when the laser source is turned on indicated by the rotation switching period is reached.

The micro-mirrors 2401 performing the rotation switching may be all or part of the micro-mirrors 2401 in the DMD 240. For example, if images displayed by some pixels in a plurality of consecutive frame images are images with a same gray scale, in a display process of the images including these pixels, micro-mirrors 2401 corresponding to these pixels are prone to the mechanical fatigue. Therefore, there is a need to make these micro-mirrors 2401 (i.e., part but not all) perform the rotation switching to relieve a fatigue state.

In some embodiments, the flip control signal may be sent to the DMD 240 by the DLP control processing portion 430, and the DMD 240 drives the micro-mirrors 2401 to perform the rotation switching between the ON state and the OFF state according to the flip control signal; or, the flip control signal may be sent to the DMD 240 by the processor performing S010, and the DMD 240 drives the micro-mirror 2401 to perform the rotation switching between the ON state and the OFF state according to the flip control signal.

In some embodiments, micro-mirrors performing the rotation switching are part of the micro-mirrors 2401. As described above, which micro-mirrors 2401 need to perform the rotation switching may be determined according to the gray scale information of each pixel in the image display signals of the image to be displayed. In some embodiments, steps of determining the part of the micro-mirrors that need to perform the rotation switching are as follows.

Gray scale information of each pixel in a plurality of consecutive frame images to be displayed is obtained.

It is determined whether a continuous holding time of the micro-mirror corresponding to each pixel in the ON state or the OFF state exceeds a set safe holding time according to the gray scale information of each pixel corresponding to the plurality of consecutive frame images to be displayed in a projection display process of the images to be displayed.

If so, the micro-mirror whose continuous holding time exceeds the set safe holding time in the ON state or the OFF state needs to be flipped repeatedly.

Each pixel corresponding to the plurality of consecutive frame images to be displayed refers to each pixel at a same position in the plurality of consecutive frame images to be displayed. For example, in a case where one frame image has m rows and n columns of pixels, a position of a pixel in the frame image may be determined according to a row and a column in which it is located.

The plurality of consecutive frame images to be displayed may be several, a dozen, several tens of or several hundreds of consecutive frame images to be displayed.

The safe holding time is determined by a mechanical structure included in a driving device of the micro-mirror 2401 in the DMD 240, and different driving devices (including different structures, processing techniques, and materials) correspond to different safe holding times. Therefore, the set safe holding time may be specifically set according to the DMD 240, which is not specifically limited here. If the continuous holding time of the micro-mirror 2401 in a certain state exceeds the set safe holding time, it is considered that the micro-mirror is in a mechanically fatigue state, and thus it needs to be repeatedly flipped.

After determining the part of the micro-mirrors that need to be repeatedly flipped according to image display signals of the plurality of consecutive frame images to be displayed, it is possible to repeatedly flip only this part of the micro-mirrors in a targeted manner, which improves efficiency.

Figure 13:
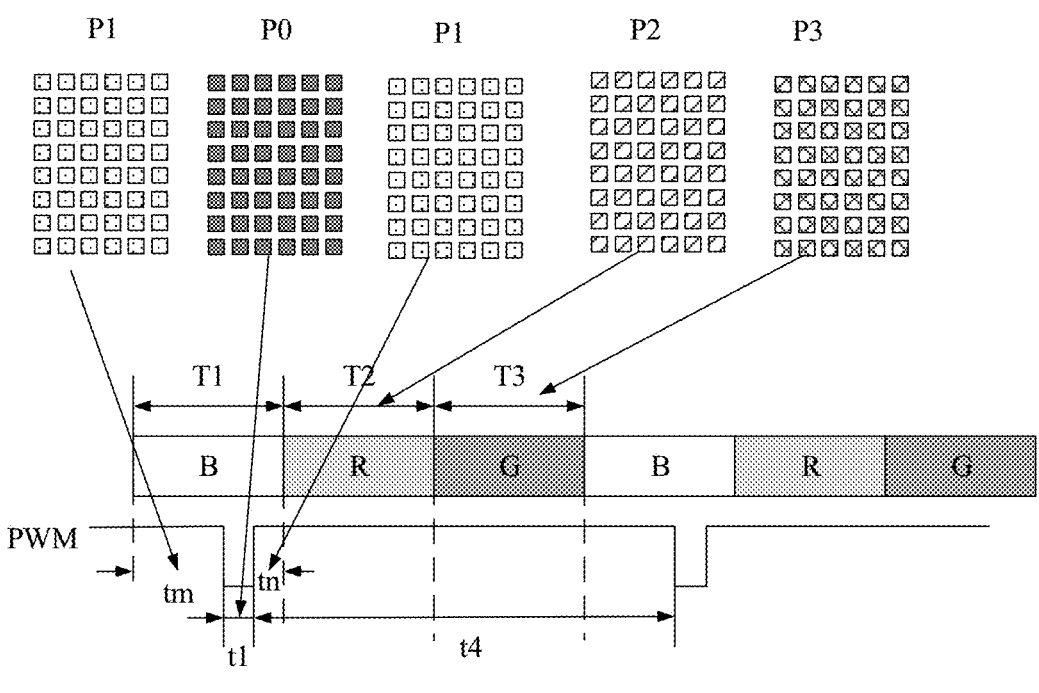
FIG. 13 is a schematic diagram showing a process of the rotation switching shown in FIG. 12.

Regardless of whether all the micro-mirrors perform the rotation switching, or only part of the micro-mirrors perform the rotation switching, a principle of driving the micro-mirrors to perform the rotation switching will be described below by taking an example in which the rotation switching period is configured within the output period T1 of the blue beam. As shown in FIG. 13, the output period T1 of the blue beam is divided into three periods: tm, t1, and tn. The t1 period is the rotation switching period, and the tm and tn periods are blue image component display periods. Correspondingly, in the tm period, an image display signal P1 corresponding to the blue image component in the image to be displayed is output to the DMD 240, and the micro-mirrors 2401 are switched between the ON state and the OFF state according to a drive signal corresponding to the image display signal P1. In an example, the image display signal P1 has an irregular gray scale distribution (a non-solid color image) or a regular gray scale distribution (a solid color image). Then, in the t1 period, the flip control signal P0 is output to the DMD 240, and the flip control signal P0 correspondingly generates digital drive signals of 0,1,0,1, . . . , and the micro-mirrors 2401 are repeatedly flipped under control of the digital drive signals. In this case, correspondingly, the luminance adjustment signal of the blue laser array 110 is zero, and the luminance adjustment signal is sent to the laser driver circuit 440 by the DLP control processing portion 430, so that the laser driver circuit 440 turns off the blue laser array 110. When the t1 period ends, the DLP control processing portion 430 restores the luminance adjustment signal of the blue primary color beam, and the blue laser array 110 is re-lit; meanwhile, the DLP control processing portion 430 re-outputs the drive signal corresponding to the image display signal P1 to the micro-mirrors 2401.

In a following timing, when the tn period ends, there is a need to switch to display of a red image component, and then the red laser array 130 is lit, or the phosphor wheel 140 is made to output red fluorescent beams. The DMD 240 receives an image display signal P2 corresponding to the red image component, and the micro-mirrors 2401 are switched between the ON state and the OFF state according to a drive signal corresponding to the image display signal P2 until the T2 period ends. By analogy, in the T3 period, the DMD 240 receives an image display signal P3 corresponding to a green image component, and the micro-mirrors 2401 are switched between the ON state and the OFF state according to a drive signal corresponding to the image display signal P3 until the T3 period ends.

It will be noted that, in the above example, it is taken as an example that the output period of the blue beam is divided into three periods for description. The rotation switching period t1 may also be set at the start moment or the end moment of the output period of the blue beam. In this way, the duration of the blue beam may also be divided into two periods, which are a lighting period and a turn-off period of the blue laser array.

According to the foregoing description, that the DLP control processing portion 430 outputs the image display signals to the DMD 240 is in synchronization with that the DLP control processing portion 430 outputs the enable signals and the luminance adjustment signals to the laser driver circuit 440, thereby completing the display of the color image.

Correspondingly, in order to cooperate with the repeated flip action of the DMD 240 in the rotation switching period, the laser source 100 also needs to be turned off synchronously, otherwise it is possible to cause confusion in the picture projected by the laser projection apparatus.

In some embodiments, as shown in FIG. 9C, S130 includes S131 to S132.

In S131, the flip control signal is configured and generated according to a minimum switching time of a micro-mirror, the minimum switching time being a shortest time for the micro-mirror to complete the rotation switching between the ON state and the OFF state once, and the flip control signal indicating the number of times for which the micro-mirror is to perform the rotation switching between the ON state and the OFF state in the rotation switching period.

In the flip control signal, a time set for the micro-mirror to perform the rotation switching between the ON state and the OFF state once is greater than or equal to the minimum switching time, so as to ensure that within the set time, the micro-mirror 2401 may complete the rotation switching once. The number of the times of the rotation switching to be performed by the micro-mirror 2401 in the rotation switching period is set according to the time set for the micro-mirror to complete the rotation switching once and the duration of the rotation switching period, so that after the DMD 240 receives the flip control signal, the micro-mirror 2401 in the DMD 240 may perform the rotation switching according to the number of the times.

In a case where the time set for the micro-mirror to complete the rotation switching once is greater than the minimum switching time of the micro-mirror 2401, and in a case of ensuring that the micro-mirror completes the rotation switching once, a time for the micro-mirror 2401 to stay in the on state and/or the off state may also be set. In this case, the flip control signal includes not only a drive signal for driving the micro-mirror 2401 to flip, but also a pause signal for making the micro-mirror 2401 stay in the on state and/or the off state.

The minimum switching time of the micro-mirror 2401 depends on a structure of the DMD 240.

In some embodiments, the flip control signal is generated by the DLP control processing portion 430; or, the flip control signal may be generated by the processor performing S010.

In S132, in the rotation switching period, the micro-mirror is driven to perform the rotation switching between the ON state and the OFF state according to the number of the times of the rotation switching indicated by the flip control signal.

In the DMD 240, each micro-mirror 2401 is independently driven by a respective driving device, so that the rotation switching of each micro-mirror 2401 may also be independent of each other.

In some embodiments, the flip control signal configured for each micro-mirror 2401 is the same, so that in a period when the laser source 100 is turned off, it is possible to perform the repeated flipping of the micro-mirrors in unison. That is, at a certain moment, all the micro-mirrors 2401 are rotated to the ON state in unison, and at another moment, they are rotated to the OFF state in unison.

In some other embodiments, the flip control signal configured for each micro-mirror 2401 is different.

In some embodiments, the DLP control processing portion 430 sends the flip control signal to the DMD 240 within the set rotation switching period t1, and the DMD 240 analyzes the flip control signal into the drive signal or the pause signal, and sends the drive signal or the pause signal to the driving device of each micro-mirror 2401. As a result, the driving device drives the respective micro-mirror 2401 to perform the rotation switching between the ON state and the OFF state, or to stay in the ON state and/or the OFF state.

In S140, at the end of the rotation switching, the micro-mirrors performing the rotation switching are controlled to return to states that they are in when the rotation switching is started.

In some embodiments, the micro-mirrors 2401 after the rotation switching are controlled to return to the states that they are in when the rotation switching is started according to the state that each micro-mirror 2401 is in when the rotation switching is started determined in S120. Thereafter, the micro-mirrors 2401 continue to be driven by the image display signals of the image to be displayed to switch between the ON state and the OFF state to perform normal projection display.

In some embodiments, the image display signals are sent to the DMD 240 by the DLP control processing portion 430 to make each micro-mirror 2401 return to the state when the rotation switching is started; or, the image display signals may be sent to the DMD 240 by the processor performing S010 to make each micro-mirror 2401 return to the state when the rotation switching is started.

In S150, after the micro-mirrors performing the rotation switching return to the states that they are in when the rotation switching is started, the laser source is controlled to be turned on, and the micro-mirrors are driven to rotate to project and display the image to be displayed until a next rotation switching period is reached.

In the projection display process, each frame image projected and displayed requires the laser source 100 to sequentially output the illumination beams of the three primary colors (the red color, the green color, and the blue color). In a process of outputting the three primary color beams in a time-sharing manner according to the set timings, each pixel in a frame image to be projected and displayed has luminance requirements for the red color, the green color and the blue color. Therefore, the micro-mirror 2401 corresponding to the pixel correspondingly reflects the red beam, the green beam, and the blue beam output by the laser source 100 according to the luminance requirements of the pixel for the three primary colors to form the image to be projected and displayed.

For the laser projection display method provided by some embodiments of the present disclosure, in the projection display process, the laser source is controlled to be turned off in the set rotation switching period, and the micro-mirrors in the DMD are driven to perform the rotation switching between the ON state and the OFF state in the period when the laser source is turned off, which may eliminate the mechanical fatigue state of the micro-mirrors. Moreover, since the rotation switching period is configured in an output period of a primary color beam in a display process of a frame image, and time for turning off the laser source is very short, the human eyes cannot perceive that the laser source is turned off. Therefore, when the laser source is turned off and the rotation switching of the micro-mirrors is performed in the rotation switching period, the image currently being projected and displayed may still be displayed normally.

In some embodiments, not all of the above steps are necessary. For example, only three steps of S110, S130 and S150 may be performed. In some embodiments, S120 and S140 may be performed based on the three steps of S110, S130 and S150, without performing remaining steps. Or, S010 to S020 may be performed based on the three steps S110, S130 and S150, without performing remaining steps. In some embodiments, there is no order of performing S110, S120 and S130. The three steps may be performed simultaneously, or S130 or S120 may be performed first. In addition to these variations of the embodiments, a person skilled in the art may also make numerous other variations within the scope of the present disclosure.

Figure 14:
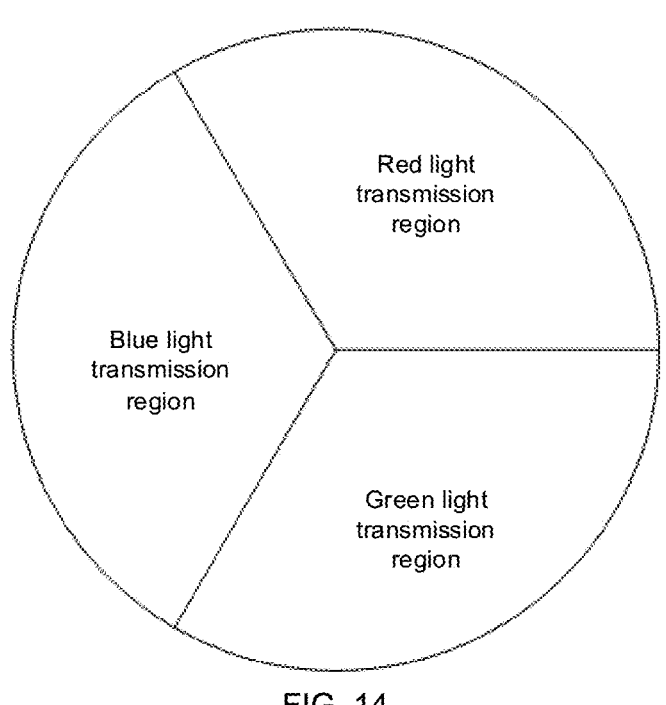
FIG. 14 is a schematic diagram of a color filter wheel, in accordance with some embodiments.
Figure 15:
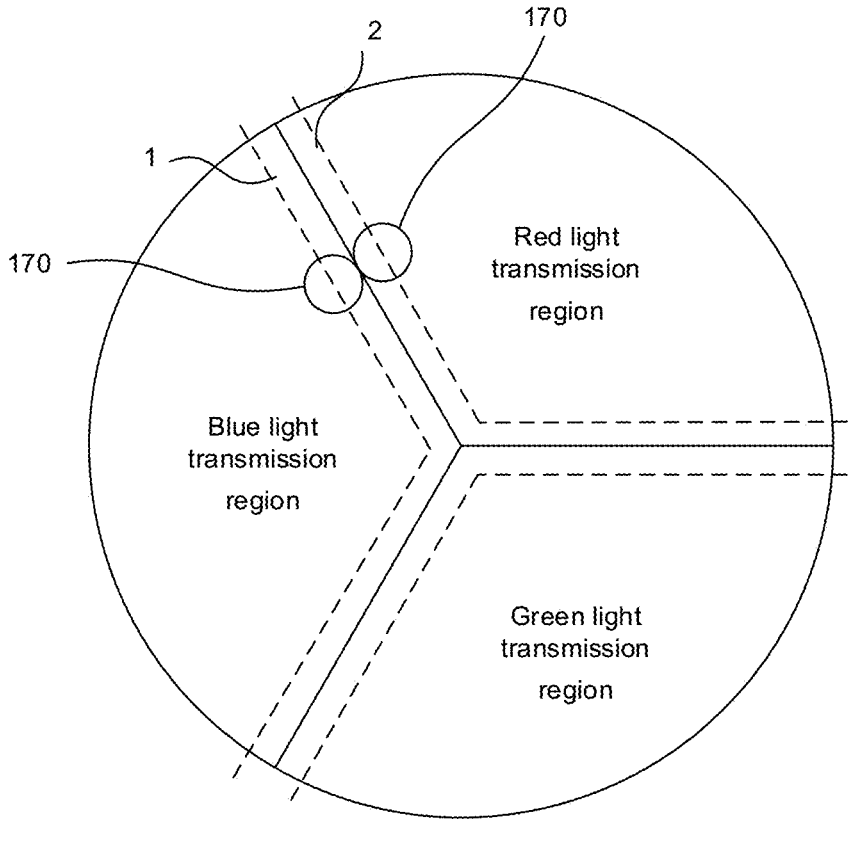
FIG. 15 is a schematic diagram of a spoke region period on the color filter wheel shown in FIG. 14.

In some embodiments, as shown in FIG. 4, the laser source 100 includes the color filter wheel 150. As shown in FIG. 14, there is a boundary between outputting two adjacent color beams on the color filter wheel 150. Since a light spot formed after the light emitted by the laser array is transmitted to the color filter wheel 150 has a certain size, when the color filter wheel 150 rotates to a region near the boundary where the two adjacent color beams are output, beams actually output by the laser source 100 are mixed color beams, e.g., mixed color beams of the blue beams and the red beams. In some embodiments, when the laser source 100 is turned on, a period in which the illumination beams become mixed color beams after being output by the color filter wheel 150 is referred to as a spoke region period. For example, for the color filter wheel 150 shown in FIG. 14, when the color filter wheel 150 rotates to a red light transmission region, red light in the light emitted by the laser source passes through the color filter wheel 150, so that the laser source outputs the red beams; and when the color filter wheel 150 rotates to a blue light transmission region, blue light in the light emitted by the laser source passes through the color filter wheel 150, so that the laser source outputs the blue beams. As shown in FIG. 15, when the color filter wheel 150 rotates to a boundary between the red light transmission region and the blue light transmission region, since the light spot 170 formed by the light emitted by the laser source 100 on the color filter wheel 150 has a certain size, the beams actually output by the laser source 100 are mixed color beams, i.e., a mixture of the blue beams and the red beams.

In order to reduce impact of the mixed color beams output by the laser source 100 in the spoke region period on the projection display effect, there are the following two processing methods.

One processing method is to turn off the laser source 100 in the spoke region period, so as to ensure that the illumination beams output by the laser source 100 are all sequential single primary color beams. For example, the color filter wheel 150 rotates counterclockwise, and the blue laser array 110 is turned off when a center of the light spot 170 is on the dashed line 1 shown in FIG. 15 in the blue light transmission region (the light spot 170 is tangent to the boundary between the blue light transmission region and the red light transmission region); and the red laser array 130 is turned on when the center of the light spot 170 is on the dashed line 2 shown in FIG. 15 in the red light transmission region (the light spot 170 is tangent to the boundary between the blue light transmission region and the red light transmission region). In this processing method, the rotation switching of the micro-mirrors 2401 may be performed in the spoke region period, and for details, reference is made to the following description; and in a non-spoke region period, only the normal projection display of the image may be performed. Of course, in the non-spoke region period, the rotation switching of the micro-mirrors 2401 may also be performed according to the above method.

The other processing method is that, in the spoke region period, the laser source 100 is still turned on, and the mixed color beams passing through the boundary are converted into single primary color beams through a wavelength conversion algorithm. Taking a spoke region period corresponding to the boundary between the red light transmission region and the blue light transmission region as an example, as shown in FIG. 15, if the blue laser array 110 is turned off and the red laser array 130 is turned on at a moment when the center of the light spot 170 is on the boundary between the blue light transmission region and the red light transmission region, the mixed color beams passing through the color filter wheel 150 when the blue laser array 110 is lit in the spoke region period are converted into blue beams, and the mixed color beams passing through the color filter wheel 150 when the red laser array 130 is lit in the spoke region period are converted into red beams, so that the spoke region period is divided into periods for outputting two primary color beams. In a sequential output cycle of the laser source, i.e., in a display cycle of a frame image, the beam output by the laser source at each moment is still a single primary color beam, i.e., the output period for the laser source to output each primary color beam includes the non-spoke region period and the spoke region period. In this case, the rotation switching period may still be configured in any period of the output period of each primary color beam.

As shown in FIG. 9B, some embodiments of the present disclosure provide another laser projection display method, which is applied in the spoke region period for the laser source to output two adjacent primary color beams. In the spoke region period, the laser source is turned off to prevent the laser source from outputting mixed primary color beams. The method includes the following steps.

In S210, in the spoke region period of the laser source, the laser source is controlled to be turned off according to the set rotation switching period, the rotation switching period is less than the spoke region period, and the spoke region period is the period in which the illumination beams become the mixed color beams after being output by the color filter wheel when the laser source is turned on.

In S230, in the rotation switching period, the micro-mirrors in the DMD are driven to perform the rotation switching between the ON state and the OFF state until the moment when the laser source is turned on indicated by the rotation switching period is reached.

In some embodiments, S230 and S130 may be a same step.

In S250, at the end of the rotation switching, the laser source is controlled to be turned on, and the micro-mirrors are driven to rotate to project and display the image to be displayed until the next rotation switching period is reached.

In some embodiments, S250 and S150 may be a same step.

In a display cycle of a frame image, the number of spoke region periods of the laser source is also different according to different numbers and types of used color wheels (e.g., color filter wheels, and phosphor wheels). In some embodiments of the present disclosure, the laser projection display method including the three steps of S210 to S250 may be performed in one spoke region period within the display cycle of the frame image, or may be performed in a plurality of spoke region periods, which is not specifically limited here.

In the present embodiments, in a case where the rotation switching period is configured within the spoke region period, since the laser source is turned off in the spoke region period, a rotation switching period with certain duration may be configured within the spoke region period, so as to perform the rotation switching of the micro-mirrors between the ON state and the OFF state in the rotation switching period. Of course, the rotation switching period may be less than or equal to the spoke region period, which is not specifically limited here.

Figure 16:
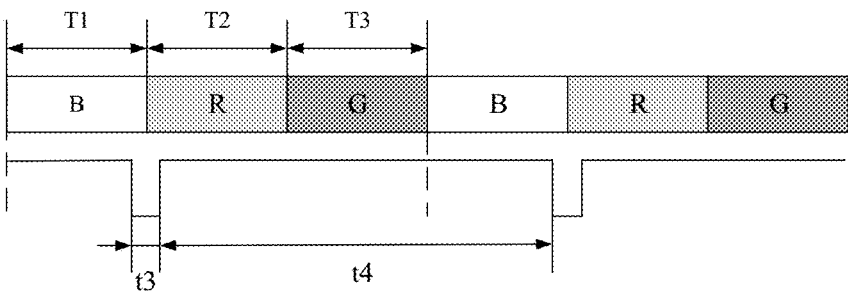
FIG. 16 is a schematic diagram of another rotation switching period, in accordance with some embodiments.

FIG. 16 is a schematic diagram of configuring the rotation switching period within the spoke region period. In FIG. 16, one spoke region period t3 and a remaining period t4 are exemplarily shown. According to the above embodiments in which the rotation switching period is configured within the spoke region period, in the cycle, the rotation switching of the micro-mirrors may be performed only in the period shown by t3. At this time, light-emitting elements of two colors (e.g., the blue laser array 110 and the red laser array 130) relating to the spoke region period may be turned off.

In some embodiments, rotation switching periods may be configured within two spoke region periods composed of the blue primary color beams and the red primary color beams, and the red primary color beams and the green primary color beams.

When the rotation switching of the micro-mirrors is performed in the spoke region period, the principle is as described above, which will not be repeated here.

In some embodiments, S120 and S140 may be performed based on the three steps of S210, S230 and S250. Or, S010 to S020 may be performed based on the three steps of S210, S230 and S250. In some embodiments, S230 may include S131 to S132.

In some embodiments, there is no order of performing S210, S120 and S230. The three steps may be performed simultaneously, or S230 or S120 may be performed first. In addition to these variations of the embodiments, a person skilled in the art may also make numerous other variations within the scope of the present disclosure.

Some embodiments of the present disclosure provide a computer-readable storage medium (e.g., a non-transitory computer-readable storage medium). The computer-readable storage medium stores computer program instructions that when running on a processor, cause the processor to perform one or more steps in the laser projection display control method described in any one of the above embodiments.

For example, the computer-readable storage medium may include, but is not limited to: a magnetic storage device (e.g., a hard disk, a floppy disk, or a magnetic tape), an optical disk (e.g., a compact disk (CD)), a digital versatile disk (DVD), a smart card and a flash memory device (e.g., an erasable programmable read-only memory (EPROM), a card, a stick or a key drive). The various computer-readable storage media described in the present disclosure may represent one or more devices and/or other machine-readable storage media for storing information. The term "machine-readable storage media" may include, but are not limited to, wireless channels and various other media capable of storing, containing, and/or carrying instruction(s) and/or data.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. A laser projection apparatus, comprising:
a laser source configured to provide illumination beams;
the laser source being a tri-color laser source, and including:

a plurality of laser arrays configured to emit beams of a plurality of primary colors, the illumination beams including the beams of the plurality of primary colors; wherein a display cycle of a frame image includes output periods of the beams of the plurality of primary colors, each of the output periods of the beams of the plurality of primary colors includes at least one first period, the output period of the beam of at least one of the plurality of primary colors further includes a second period;

an optical engine including a digital micro-mirror device, the digital micro-mirror device including a plurality of micro-mirrors, and the plurality of micro-mirrors being configured to flip at different angles due to control of a first drive signal obtained from conversion of an image display signal, so that the illumination beams provided by the laser source are modulated into projection beams;

a projection lens configured to project the projection beams on a medium for imaging; and a power system architecture configured to control the laser source and the optical engine to operate, the power system architecture including:

a laser driver circuit configured to drive the laser source to be lit or turned off; and a digital light processing (DLP) control processing portion connected to the laser driver circuit and the digital micro-mirror device, the DLP control processing portion being configured to:

generate a first enable signal and a first luminance adjustment signal according to the image display signal of an image to be displayed, and output the first enable signal and the first luminance adjustment signal to the laser driver circuit, in the first period; and generate the first drive signal according to the image display signal, and output the first drive signal to the digital micro-mirror device, in the first period; and generate a second enable signal and a second luminance adjustment signal, and output the second enable signal and the second luminance adjustment signal to the laser driver circuit, in the second period; and generate a second drive signal, and output the second drive signal to the digital micro-mirror device, in the second period; the second drive signal being at least partially different from the first drive signal, and the second luminance adjustment signal being zero value;

wherein the laser driver circuit is further configured to:

receive and perform processing on the first enable signal and the first luminance adjustment signal, and output the processed signals to the corresponding laser array, so as to drive the laser array to emit the beam of the corresponding primary color, in the first period; and receive and perform processing on the second enable signal and the second luminance adjustment signal, and output the processed signals to the corresponding laser array, so as to drive the laser array to be turned off, in the second period.

2. The laser projection apparatus according to claim 1, wherein the at least one first period included by the output period of the beam of the at least one primary color includes at least two first periods, and the second period is between the at least two first periods.

3. The laser projection apparatus according to claim 1, wherein the second period satisfies one of following:

a start moment of the second period includes a start moment of the output period of the beam of the at least one primary color; and an end moment of the second period includes an end moment of the output period of the beam of the at least one primary color.

4. The laser projection apparatus according to claim 1, wherein the beam of the at least one primary color includes at least one of a blue beam, a red beam, or a green beam.

5. The laser projection apparatus according to claim 1, wherein a duration of the second period is 1% to 4.5% of the display cycle of the frame image, inclusive.

6. The laser projection apparatus according to claim 1, wherein the DLP control processing portion is further configured to:

obtain timings for the laser source to output the illumination beams; the timings indicating the output periods for the laser source to output the beams of the plurality of primary colors; and configure the second period according to the output periods for the laser source to output the beams of the plurality of primary colors; the second period being less than the output period of the beam of the primary color in which the second period is located.

7. The laser projection apparatus according to claim 1, wherein the DLP control processing portion is further configured to:

output the same first drive signal to the digital micro-mirror device at a start moment of the second period and an end moment of the second period.

8. The laser projection apparatus according to claim 1, wherein the DLP control processing portion is further configured to:

obtain gray scale information of each pixel in a plurality of consecutive frame images to be displayed; and drive a micro-mirror corresponding to a pixel to preform rotation switching, if a continuous holding time of the micro-mirror corresponding to the pixel in an ON state or an OFF state is greater than a set safe holding time.

9. A laser projection apparatus, comprising:

a laser source configured to provide illumination beams; the laser source including:

a laser array configured to emit a laser beam of one color; and a color wheel including a plurality of regions outputting beams of different primary colors, the color wheel being configured to rotate, and sequentially output beams of a plurality of primary colors due to irradiation of the laser beam, the illumination beams including the beams of the plurality of primary colors; wherein a display cycle of a frame image includes output periods of the beams of the plurality of primary colors, each of the output periods of the beams of the plurality of primary colors includes at least one first period, the output period of the beam of at least one of the plurality of primary colors further includes a second period, the second period is in a spoke region period; display cycles of a plurality of frame images include the spoke region period, the spoke region period is portions of continuous output periods of beams of two primary colors, and the spoke region period is a continuous period, the spoke region period corresponds to a bordering region of two adjacent regions of the color wheel;

an optical engine including a digital micro-mirror device, the digital micro-mirror device including a plurality of micro-mirrors, and the plurality of micro-mirrors being configured to flip at different angles due to control of a first drive signal obtained from conversion of an image display signal, so that the illumination beams provided by the laser source are modulated into projection beams;

a projection lens configured to project the projection beams on a medium for imaging; and a power system architecture configured to control the laser source and the optical engine to operate, the power system architecture including:

a laser driver circuit configured to drive the laser source to be lit or turned off; and a DLP control processing portion connected to the laser driver circuit and the digital micro-mirror device, the DLP control processing portion being configured to:

generate a first enable signal and a first luminance adjustment signal according to the image display signal of an image to be displayed, and output the first enable signal and the first luminance adjustment signal to the laser driver circuit, in the first period; and generate the first drive signal according to the image display signal, and output the first drive signal to the digital micro-mirror device, in the first period;

generate a second enable signal and a second luminance adjustment signal, and output the second enable signal and the second luminance adjustment signal to the laser driver circuit, in the spoke region period; the second luminance adjustment signal being zero value; and generate a second drive signal, and output the second drive signal to the digital micro-mirror device, in the second period; the second drive signal being at least partially different from the first drive signal;

wherein the laser driver circuit is further configured to:

receive and perform processing on the first enable signal and the first luminance adjustment signal, and output the processed signals to the laser array, so as to drive the laser array to emit the laser beam, in the first period; and receive and perform processing on the second enable signal and the second luminance adjustment signal, and output the processed signals to the laser array, so as to drive the laser array to be turned off, in the spoke region period.

10. The laser projection apparatus according to claim 9, wherein the at least one first period included by the output period of the beam of the at least one primary color includes at least two first periods, and the second period is between the at least two first periods.

11. The laser projection apparatus according to claim 9, wherein the second period satisfies one of following:

a start moment of the second period includes a start moment of the output period of the beam of the at least one primary color; and an end moment of the second period includes an end moment of the output period of the beam of the at least one primary color.

12. The laser projection apparatus according to claim 9, wherein the beam of the at least one primary color includes at least one of a blue beam, a red beam, or a green beam.

13. The laser projection apparatus according to claim 9, wherein a duration of the second period is 1% to 4.5% of the display cycle of the frame image, inclusive.

14. The laser projection apparatus according to claim 9, wherein the DLP control processing portion is further configured to:

obtain timings for the laser source to output the illumination beams; the timings indicating the output periods for the laser source to output the beams of the plurality of primary colors; and configure the second period according to the output periods for the laser source to output the beams of the plurality of primary colors; the second period being less than the output period of the beam of the primary color in which the second period is located.

15. The laser projection apparatus according to claim 9, wherein the DLP control processing portion is further configured to:

output the same first drive signal to the digital micro-mirror device at a start moment of the second period and an end moment of the second period.

16. The laser projection apparatus according to claim 9, wherein the DLP control processing portion is further configured to:

obtain gray scale information of each pixel in a plurality of consecutive frame images to be displayed; and drive a micro-mirror corresponding to a pixel to preform rotation switching, if a continuous holding time of the micro-mirror corresponding to the pixel in an ON state or an OFF state is greater than a set safe holding time.

17. A laser projection display method, applied to a laser projection apparatus, the laser projection apparatus including:

a laser source configured to provide illumination beams; the laser source including:

a laser array configured to emit a laser beam of one color; and a color wheel including a plurality of regions outputting beams of different primary colors, the color wheel being configured to rotate, and sequentially output beams of a plurality of primary colors due to irradiation of the laser beam, the illumination beams including the beams of the plurality of primary colors; wherein a display cycle of a frame image includes output periods of the beams of the plurality of primary colors, each of the output periods of the beams of the plurality of primary colors includes a first period, the output period of the beam of at least one of the plurality of primary colors further includes a second period, the second period is in a spoke region period; display cycles of a plurality of frame images include the spoke region period, the spoke region period is portions of continuous output periods of beams of two primary colors, and the spoke region period is a continuous period, the spoke region period corresponds to a bordering region of two adjacent regions of the color wheel;

an optical engine including a digital micro-mirror device, the digital micro-mirror device including a plurality of micro-mirrors, and the plurality of micro-mirrors being configured to flip at different angles due to control of a drive signal obtained from conversion of an image display signal, so that the illumination beams provided by the laser source are modulated into projection beams;

a projection lens configured to project the projection beams on a medium for imaging; and a power system architecture configured to control the laser source and the optical engine to operate, the power system architecture including:

a laser driver circuit configured to drive the laser source to be lit or turned off; and a DLP control processing portion connected to the laser driver circuit and the digital micro-mirror device;

wherein the method comprises:

controlling the laser array to emit the laser beam and the digital micro-mirror device to project and display an image to be displayed according to the image display signal of the image to be displayed, in the first period;

controlling the laser array to be turned off, in the spoke region period; and controlling all or part of the micro-mirrors in the digital micro-mirror device to perform rotation switching between an ON state and an OFF state, in the second period.

18. The method according to claim 17, further comprising:

obtaining timings for the laser source to output the illumination beams; the timings indicating the output periods for the laser source to output the beams of the plurality of primary colors; and configuring the second period according to the output periods for the laser source to output the beams of the plurality of primary colors; the second period being less than the output period of the beam of the primary color in which the second period is located.

19. The method according to claim 17, further comprising:

controlling the state of each micro-mirror at a start moment of the second period to be same as the state of each micro-mirror at an end moment of the second period.

20. A non-transitory computer-readable storage medium storing computer program instructions that when executed by a processor, cause the processor to implement the method according to claim 17.

* * * * *